United States Patent
Yue et al.

(10) Patent No.: US 10,838,779 B1
(45) Date of Patent: Nov. 17, 2020

(54) AUTOMATIC MULTISTEP EXECUTION

(71) Applicant: Brain Technologies, Inc., San Mateo, CA (US)

(72) Inventors: Sheng Yue, San Mateo, CA (US); Yuan Lin, San Mateo, CA (US)

(73) Assignee: Brain Technologies, Inc., San Mateo, CA (US)

( * ) Notice: Subject to any disclaimer, the term of this patent is extended or adjusted under 35 U.S.C. 154(b) by 179 days.

(21) Appl. No.: 15/843,973

(22) Filed: Dec. 15, 2017

Related U.S. Application Data

(60) Provisional application No. 62/507,670, filed on May 17, 2017, provisional application No. 62/476,381, filed on Mar. 24, 2017, provisional application No. 62/438,416, filed on Dec. 22, 2016.

(51) Int. Cl.
*G06F 9/54* (2006.01)
*G06F 9/451* (2018.01)

(52) U.S. Cl.
CPC .............. *G06F 9/541* (2013.01); *G06F 9/453* (2018.02)

(58) Field of Classification Search
CPC ................................ G06F 9/541; G06F 9/453
See application file for complete search history.

(56) References Cited

U.S. PATENT DOCUMENTS

| | | | |
|---|---|---|---|
| 2006/0218563 A1 | 9/2006 | Grinstein et al. | |
| 2007/0250315 A1* | 10/2007 | Bennett | G06F 17/24 704/235 |
| 2014/0278365 A1 | 9/2014 | Zhang et al. | |
| 2015/0301729 A1 | 10/2015 | Wang et al. | |
| 2015/0356404 A1 | 12/2015 | Sanchez | |
| 2016/0188661 A1 | 6/2016 | Huang et al. | |
| 2017/0084273 A1 | 3/2017 | Zohar et al. | |
| 2017/0132199 A1 | 5/2017 | Vescovi et al. | |
| 2017/0316363 A1* | 11/2017 | Siciliano | G06F 3/0482 |
| 2018/0039567 A1 | 2/2018 | Rajagopalan et al. | |
| 2018/0144053 A1 | 5/2018 | Ankisettipalli et al. | |

OTHER PUBLICATIONS

United States Office Action, U.S. Appl. No. 15/843,891, dated Jun. 10, 2020, 21 pages.
United States Office Action, U.S. Appl. No. 15/843,955, dated Apr. 15, 2020, nine pages.
United States Office Action, U.S. Appl. No. 15/843,891, dated Jan. 16, 2020, 18 pages.

\* cited by examiner

*Primary Examiner* — Doon Y Chow
*Assistant Examiner* — Kimberly L Jordan
(74) *Attorney, Agent, or Firm* — Fenwick & West LLP

(57) ABSTRACT

Disclosed is a system for automatically executing multiple functional units of operation from multiple applications to complete a task that requires data from a variety of sources. The system stores information about operations that may be executed on a client device. When executing a sequence of operations, for example in response to a user request, the system may automatically store output from each operation. When executing subsequent operations in the sequence of operations, the system can determine whether output from a previously executed operation is appropriate for use as input to a new operation. The system can thus save data from one application and automatically use that data as input to a different application. Additionally, the system may determine subsequent operations to execute in response to previously observed output values.

18 Claims, 32 Drawing Sheets

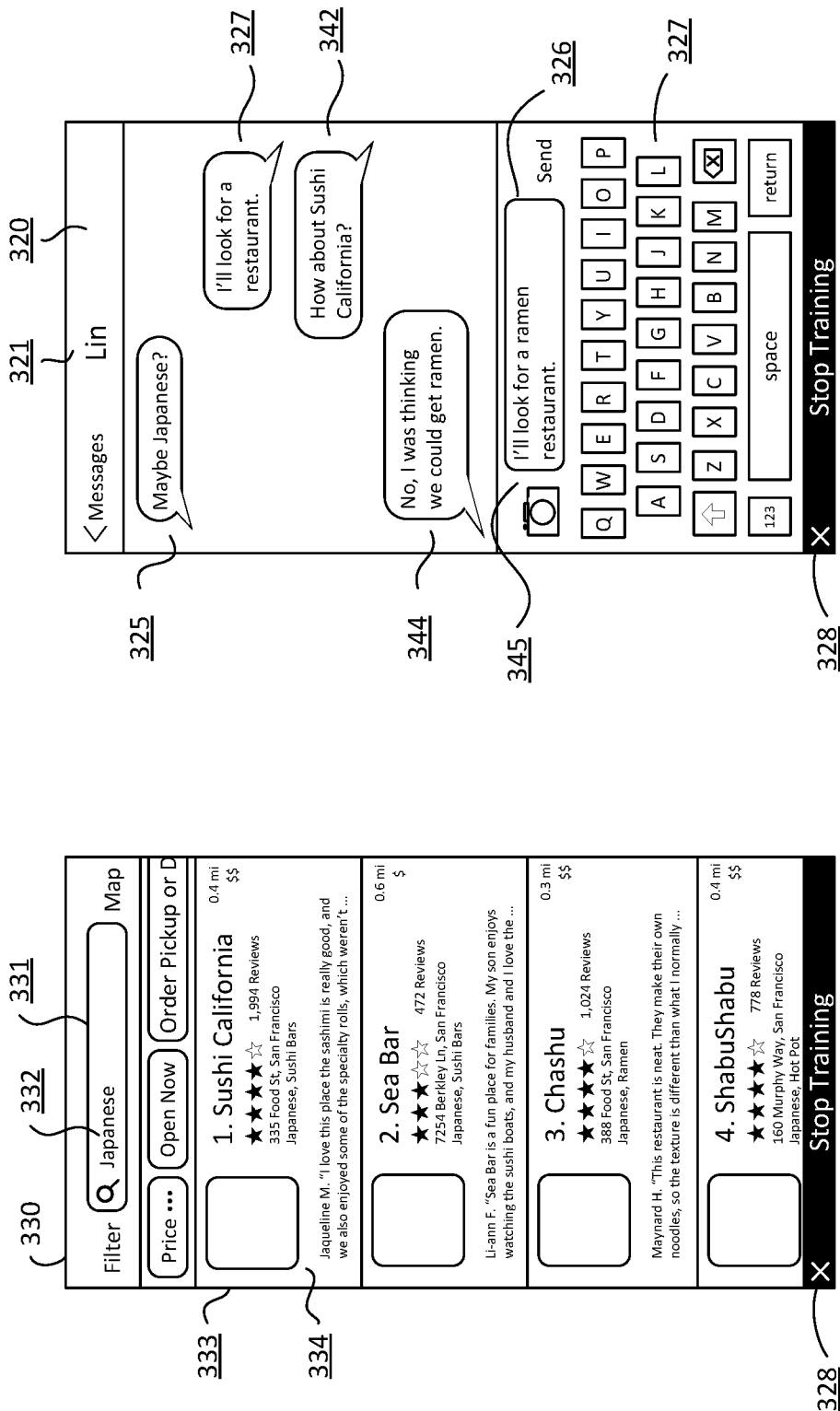

"I love the garlic noodles at this place."

Comment
2020

FIG. 20A

Filter 🔍 Dinner        Map

Price ···   Open Now   Order Pickup or D

1. Chashu                           0.3 mi
                                    $$
★★★★☆ 1,024 Reviews
388 Food St, San Francisco
Ramen, Japanese
Maynard H. "This restaurant is neat. They make their own noodles, so the texture is different than what I normally...

2. Noodle Bowl                      0.5 mi
                                    $$
★★★☆☆ 472 Reviews
276 Main, San Francisco
Dinner, Noodles
Will B. "The servings are so big here!! I really like the tonkatsu ramen. It comes with an egg, seaweed, and 3. Great Wok                        0.3 mi
                                    $$
★★★☆☆ 931 Reviews
265 Food St, San Francisco
Chinese, Take-out
Richard P. "I was looking for a new place to get fast delicious Chinese. This place will do take-out or you can eat in the....

4. Carrot Juice Bar                 9 mi
                                    $
★★★☆☆ 38 Reviews
447 8th Avenue, San Mateo
Juice, snacks, dessert User Interface Element
2010

AUTOMATIC MULTISTEP EXECUTION

CROSS-REFERENCE TO RELATED APPLICATIONS

This application claims a benefit of U.S. Provisional Application No. 62/438,416, filed Dec. 22, 2016, U.S. Provisional Application No. 62/476,381, filed Mar. 24, 2017, and U.S. Provisional Application No. 62/507,670, filed May 17, 2017, all of which are incorporated by reference in their entirety.

TECHNICAL FIELD

The disclosure generally relates to the field of automated virtual assistants, and more generally, to configurations for implementing and structuring automated program execution.

BACKGROUND

Automated virtual assistants are computing configurations configured to receive an input (e.g., a request) and act (e.g., interact, respond, execute a command, etc.) in response to the input. Examples of automated virtual assistants include computing configurations that allow a user to interact with software applications using natural language inputs and computing configurations that respond to those inputs. One problem with virtual assistants is that they can only interact with a single application (e.g., a single computer program) with each inputted request. As a result, a user may need to issue multiple requests to an automated virtual assistant to complete a task. Furthermore, a user needs to know the precise commands to input to the automated virtual assistant else the virtual assistant will not be able to complete a task. Moreover, how comments are input may be just as important, as many automated virtual assistants require a precise format to enter a request. Accordingly, the processing limitations of automated virtual assistants result in computing configurations that are limited in terms of processing capabilities. In turn, this makes the process for completing tasks through an automated virtual assistant laborious, time-consuming, repetitive, and tedious.

Another problem with automated virtual assistants is that they can only complete a task through a specific purpose-built application. That is, unless an application is explicitly designed to work with a virtual assistant, or unless the virtual assistant has been trained to interact with an application via an open application program interface (API) of the application, the virtual assistant cannot make use of the functionality of that specific application. Hence, the processing capabilities of such configurations are highly constrained. Hence, these technical limitations create an ineffective automated virtual assistant while also frustrating users who can only use the automated virtual assistant to complete a limited number of tasks using a limited set of applications. Because these automated virtual assistances can only complete one task at a time using specific software applications, they also cannot collect information from a previously completed task for use as input in future tasks and cannot combine information obtained from multiple resources (i.e., various software applications) to generate a response to a user request.

Additionally, many automated virtual assistants do not predict user requests and prompt users with possible actions that can be taken in response to user requests. One reason why it is difficult for automated virtual assistants to present suggested requests to a user is because they do not collect enough relevant information about user relationships and interests. The further constraint on processing with respect to prediction and extrapolation results in inadequate experiences for users when trying to interact with automated virtual assistants.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3C is an example user interface depicting part of the sequence of operations, according to an example embodiment.

FIG. 3D is an example user interface depicting part of the sequence of operations, according to an example embodiment.

FIG. 20A illustrates an example of a user-provided comment that relates to a selected user interface element, in accordance with an example embodiment.

Figure 1A:
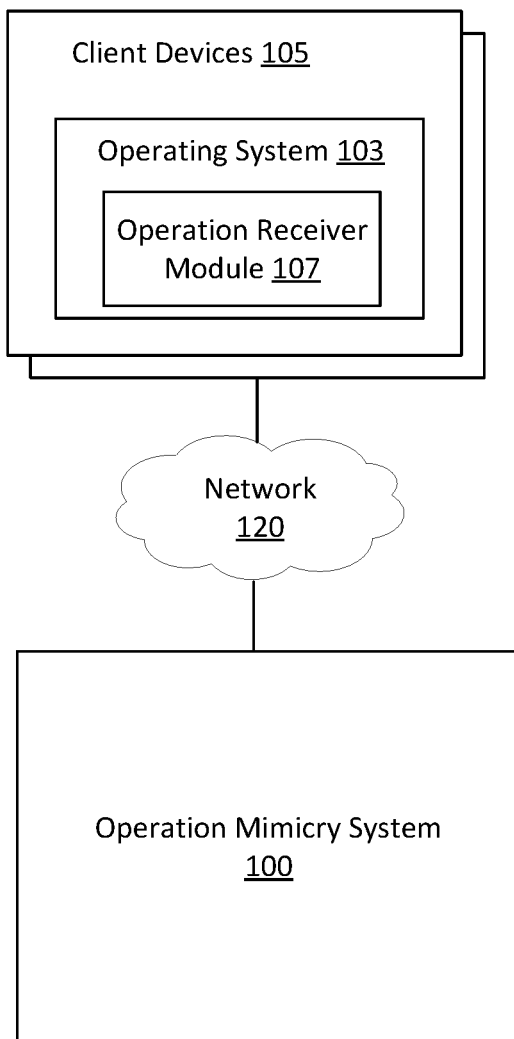
FIG. 1A illustrates a system environment for an operation mimicry system, according to an example embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed herein by way of example embodiments are systems and methods associated with an operation mimicry system. The disclosed system and method configurations also may include computer readable storage medium configurations comprised of corresponding stored instructions that cause one or more processors (generally processor) to perform the specified functionalities as noted throughout.

By way of example, one configuration embodiment may include performance of a sequence of operations. For example, a configuration may include receiving a request via a computing system and, based on the request, and determining a set of tasks to complete for responding to the request. For each of the determined tasks, the method includes selecting a sequence of operations from a data store of operations. After selecting operations for each set of tasks, the operations are configured into an overall sequence of operations that completes all of the tasks. Content is initialized within view-structures associated with each operation in the overall sequence of operations, and the overall sequence of operations is transmitted to an operating system for execution.

Another example embodiment includes a configuration for collecting and storing user inputs and interactions with software applications. The configuration may include receiving a first indication from a client device that training is beginning. For each operation that is performed on the client device after training has started, information about an associated view-structure of the application and an event associated with the view-structure is stored to an operation data store. The operation data store may keep the information in an operation graph that includes nodes representative of view-structures and edges representative of events that prompt transitions between view structures. The configuration may further include receiving an indication from the client device that training is over. To execute an operation that was recorded from the client device, the method includes retrieving information about the view-structure and about a process associated with the view structure from the operation store and providing instructions to execute the view-structure and the associated process to an operating system.

Still another example embodiment includes a configuration for collecting operations via system processes. The configuration may include receiving a report that an event has occurred on a client device and transmitting information about the report to an operation mimicry system. The configuration may further include receiving a request from the operation mimicry system for data about a view structure associated with the reported event and obtaining information about the view-structure and about the event from the client device. The obtained information may include instructions that an operating system can interpret for executing the event on a client device. A configuration may further include providing the view-structure and event information to the operation mimicry system for storage in relation to one another within an operation store.

Further disclosed herein are embodiments for a configuration to use collected data as future input values. The configuration may include executing a functional unit of operation, receiving output data subsequent to execution of the first functional unit, and determining what information from the output data may be useful as input to future functional units. The configuration also may include encoding the information from the output data into a standard data format and storing the encoded output data in a data store. When a subsequent functional unit that requires the previously stored output as input is prepared for execution, a configuration may include retrieving the encoded output data from the data store, decoding the encoded output data from the standard data format into whatever format is required by the subsequent functional unit and executing the subsequent functional unit using the previously output data as input.

This disclosure may further include a configuration for application of the operation mimicry system. One such example configuration may include parsing information from data that is currently executing on an operating system associated with a user device and determining a set of actions that a user of the user device is likely to request based on the parsed information. The configuration may further include presenting a set of suggestions to a user, each suggestion for an action in the set of determined actions. After receiving a user selection of one of the presented actions, the method includes generating a sequence of functional units that correspond to the selected action and executing the sequence of functional units.

Another example configuration may include leveraging an operation mimicry system that includes receiving information about a selection of a user interface element and receiving an accompanying comment from a user who selected the element. The configuration may include determining a concept represented by the user interface element and storing the comment in a relationship graph that stores the concept in relation to the comment. To make use of the information in the relationship graph, a configuration may include receiving a query from a user, determining an edge of the relationship graph that is representative of information related to the query, and performing a task in response to the user query, the task being based at least in part on concepts attached to the determined edge of the relationship graph.

Further disclosed by way of example configuration embodiments is an operation mimicry system. The operation mimicry system may suggest sequences of one or more automated operations that may be executed by an operating system of a computing device. An operation may be a system process or may be a functional or code level operational behavior. At a high level, an operation may be an action initiated by a user via an interaction with a component of a rendered user interface. The operation may include a corresponding system process executed through a computer operating system to manage rendering and event dispatching in response to the action initiated through the user interaction.

An operation suggested by the operation mimicry system may be selected to respond to one or more tasks implied in a request initiated by a user. A request may correspond to terms that may correspond to a task to be performed. The terms ultimately may be translated to one or more commands for execution via the operation mimicry system, as described herein, for the task to be performed. The executed commands correspond to operations that may be undertaken in the operation mimicry system.

By way of example, the operation mimicry system may use techniques for interacting with local and third-party applications and software on a client device, which may require access to underlying architecture. In another example, the operation mimicry system may access an application programming interface (API) associated with the application to carry out an operation. Further by example, the operation mimicry system described herein may access structures of user interfaces, and information about corresponding user interactions with application components to access and manipulate applications without the need for specific API calls or explicit access to backend architectures. Thus, the system may make use of many applications to respond to one or more user requests automatically. Additionally, this allows the system to use information from multiple applications to inform a response to a user request such that the user does not need to specifically and sequentially request individual applications to access in the process of completing a complex task that requires data from various sources.

An operation mimicry system may obtain sequences of operations by recording changes made to the structure and content of user interfaces on a client computing device (or client device). The changes correspond to actions a user may perform when interacting with an application on the client device. For example, the operation mimicry system may obtain data associated with a transition from a first user interface to a second user interface, for example, in response to a user selection (e.g., a touch screen tap or computing mouse click) of a button that is present in (or otherwise interacts with components of) the first user interface. The data about operations and sequences of operations that are performed on client devices may be stored in a data store by the operation mimicry system.

A user may submit a request to the operation mimicry system using a client device. User requests may be submitted to a client device in a natural language format. The natural language format may be composed of text, voice, and/or thoughts as interpreted by a brain monitoring device. User requests may be made up of terms (i.e., words) that may express one or more tasks that the user wants the client device to perform. The operation mimicry system determines the one or more intents implied in a user's request by deconstructing the user request into its component terms and analyzing the relative importance of the terms. The intents ultimately may correspond to particular commands for execution, as further described herein, for the task to be performed.

The operation mimicry system may generate a sequence of operations that can be interpreted as a series of instructions (e.g., in the form of one or more commands) by an operating system of the client device and executed by the operating system to complete the one or more tasks that are indicated by the intents that the system found to be implicit in the user request. In one example embodiment, the operation mimicry system may base its selection of suggested operations on operations and sequences of operations that it has previously obtained by recording data about user interactions with client devices. The operation mimicry system may configure instructions for executing the selected sequence of operations, and transmit the instructions to be executed by an operating system of a client device and/or on an operating system of another system that executes the instructions (or subset of instructions) for a client device.

System Environment

Referring now to Figure (FIG. 1A, it illustrates a system environment for an operation mimicry system, according to an example embodiment. The system environment, shown by FIG. 1A, may include one or more client devices 105, operation mimicry system 100, and network 120. In some embodiments, client device 105 further comprises operating system 103 and operation receiver module 107. In alternative configurations, different and/or additional components may be included in the system environment.

The term "operation mimicry system" may refer to a system that provides one or more client devices 105 with possible sequences of operations to execute when a user requests (or has asked) client device 105 to do something, for example, a task. The request may be made, for example, by typing a request into a text field on a screen of client device 105. Operation mimicry system 100 may be configured to record sequences of operations performed by users on client devices 105 (or performed using an automatic crawling program) and to subsequently break down the recorded sequences into their component operations. In some example embodiments, operation mimicry system 100 may additionally store pre-programmed operations and sequences of operations, as provided by system administrators or developers. Component operations obtained from one or more recorded sequences are assembled into a new sequence of operations to execute in response to a request from client device 105, thereby "mimicking" the originally recorded operations by suggesting that client device 105 execute the same or similar operations that have been previously performed, for example, by one or more users, to achieve a similar result or a new result. A more comprehensive description of operations and sequences of operations is further described below.

A user can interact with operation mimicry system 100 through client device 105. One or more client devices 105 are computing devices capable of receiving user input and transmitting and/or receiving data via network 120. In one embodiment, client device 105 is a conventional computer system, such as a desktop or laptop computer. Alternatively, client device 105 may be a device having computer functionality, such as a personal digital assistant (PDA), a mobile telephone, a smartphone, a tablet, a smart watch, an Internet of Things (IoT) appliance, or another suitable device. In one embodiment, client device 105 is configured to communicate via network 120.

In some embodiments, client device 105 includes operating system 103. This may be, for example, a Windows®, OSX®, Linux or other operating system if client device 105 is a personal computer or similar device. Operating system 103 may be a proprietary system. Still further, operating system 103 may be iOS®, Android® or a similar mobile device operating system if client device 105 is a mobile device. Other examples of operating system 103, for example for IoT devices, include Contiki, TinyOS, and RIOT. Operating system 103 provides an environment for other software, drivers and peripherals to function.

In some embodiments, operation receiver module 107 may be installed on operating system 103. Operation receiver module 107 may receive sequences of operations from operation mimicry system 100 and further configure the sequences of operations for execution by operating system 103. For example, operation receiver module 107 may act as an interface between operating system 103 and operation mimicry system 100, ensuring that the instructions received from operation mimicry system 100 execute safely and correctly on operating system 103.

Through use of client device 105, a user can make a user request to operation mimicry system 100. Client device 105 may be able to accept user requests from users in the form of natural language inputs. The natural language input may be, for example, text and/or voice input. A user request can include implicit or explicit instructions to perform a task.

According to one embodiment, client device 105 can provide information about operations performed on operating system 103 to operation mimicry system 100. An "operation" may be an individual task performed by an application or operating system 103 for a user on a client device 105 that causes a change in the state of the client device 105. Examples of operations include starting an application or responding to a button click within an application. Operations are executed by the operating system 103. A "sequence of operations" may be an ordered list of one or more operations that can be performed together to complete a larger task, for example, in response to a user request. A sequence of operations can include operations performed using one or more applications.

Operation mimicry system 100 may be configured to provide sequences of operations to client devices 105 in response to user requests. Operating systems 103 may execute the sequences of operations to perform tasks associated with the user requests via client devices 105 without user participation. In one embodiment, operation mimicry system 100 may construct sequences of operations in response to a request, the constructed sequences of operations being based on the results of previously recorded or crawled operations and sequences of operations performed by one or more users on client devices 105. In one example embodiment, operation mimicry system 100 may include preprogrammed sequences of operations that operation mimicry system 100 can send to client devices 105 to be performed on operating system 103 of client device 105 in response to user requests. In one embodiment, preprogrammed sequences of operations may be stored directly on client devices 105, such as on operating system 103. Additional details about the system architecture of operation mimicry system 100 are provided in the description of FIG. 2.

The client devices 105 may communicate with the operation mimicry system 100 via network 120, which may comprise any combination of local area and wide area networks employing wired or wireless communication links. In one example embodiment, network 120 uses standard communications technologies and protocols. For example, network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

Figure 1B:
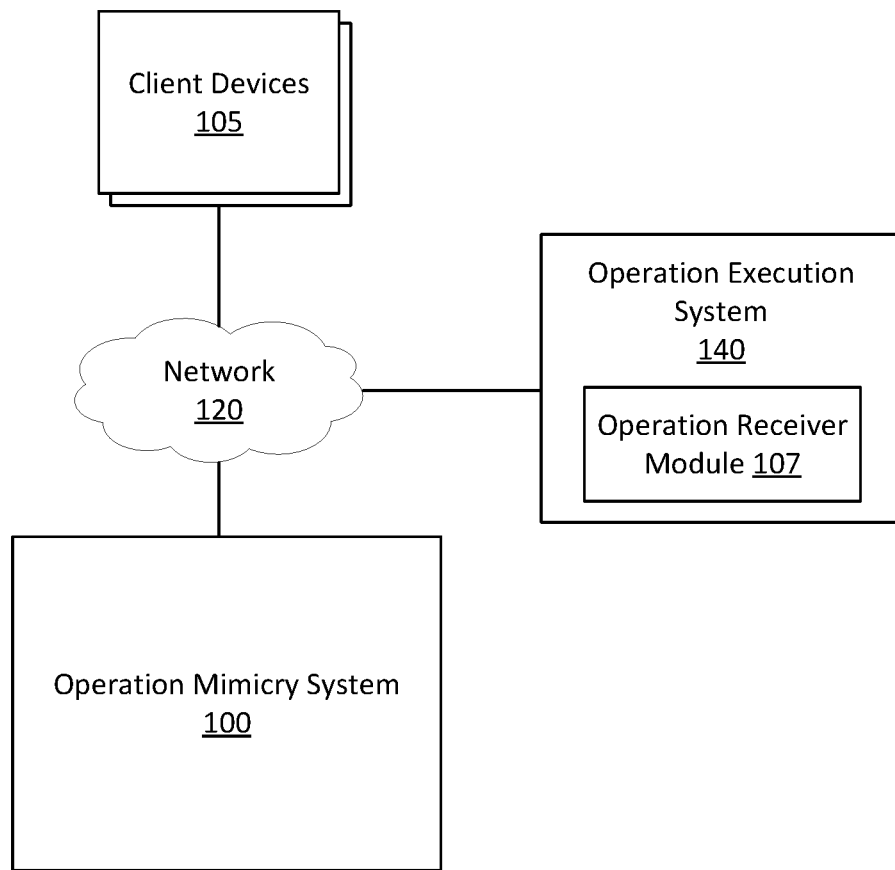
FIG. 1B illustrates a system environment for the operation mimicry system, according to another example embodiment.
Figure 1C:
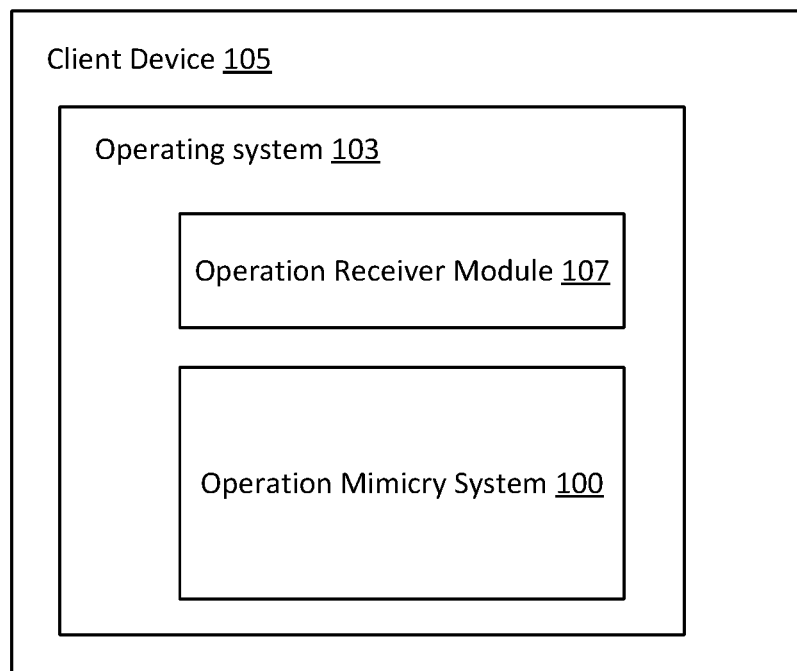
FIG. 1C illustrates a system environment for the operation mimicry system, according to another example embodiment.

FIG. 1B and FIG. 1C illustrate alternative system environments for the operation mimicry system 100, according to some example embodiments. FIG. 1B may include client devices 105, network 120, operation mimicry system 100, and operation execution system 140. Client devices 105 in this example embodiment do not necessarily have operating system 103 or operation receiver module 107. Operation mimicry system 100 may receive user requests from client devices 105, and may provide sequences of operations in response to user requests to operation execution system 140. As in the example embodiment shown in FIG. 1A, operation mimicry system 100 may construct sequences of operations that are based on the results of previously recorded or crawled operations and sequences of operations performed by one or more users on client devices 105. In one example embodiment, operation mimicry system 100 may include preprogrammed sequences of operations that operation mimicry system 100 can send to client devices 105 to be performed on operating system 103 of client device 105 in response to user requests. Operation execution system 140 is a computer with an operating system that may execute sequences of operations provided by operation mimicry system 100. Operation execution system 140 may include operation receiver module 107 for receiving, interpreting, configuring, and executing sequences of operations. Operation execution system 140 may transmit information about the results and progress of the execution of a sequence of operations to client device 105 that requested the sequence of operations.

Further, as shown in FIG. 1C, operation mimicry system 100 may be a component of operating system 103 on client device 105. Rather than communicating user requests over network 120, client device 105 may communicate user requests to operation mimicry system 100 directly, via operating system 103. In some embodiments, operation receiver module 107 may act as an interface between operation mimicry system 100 and operating system 103.

System Architecture

Figure 2:
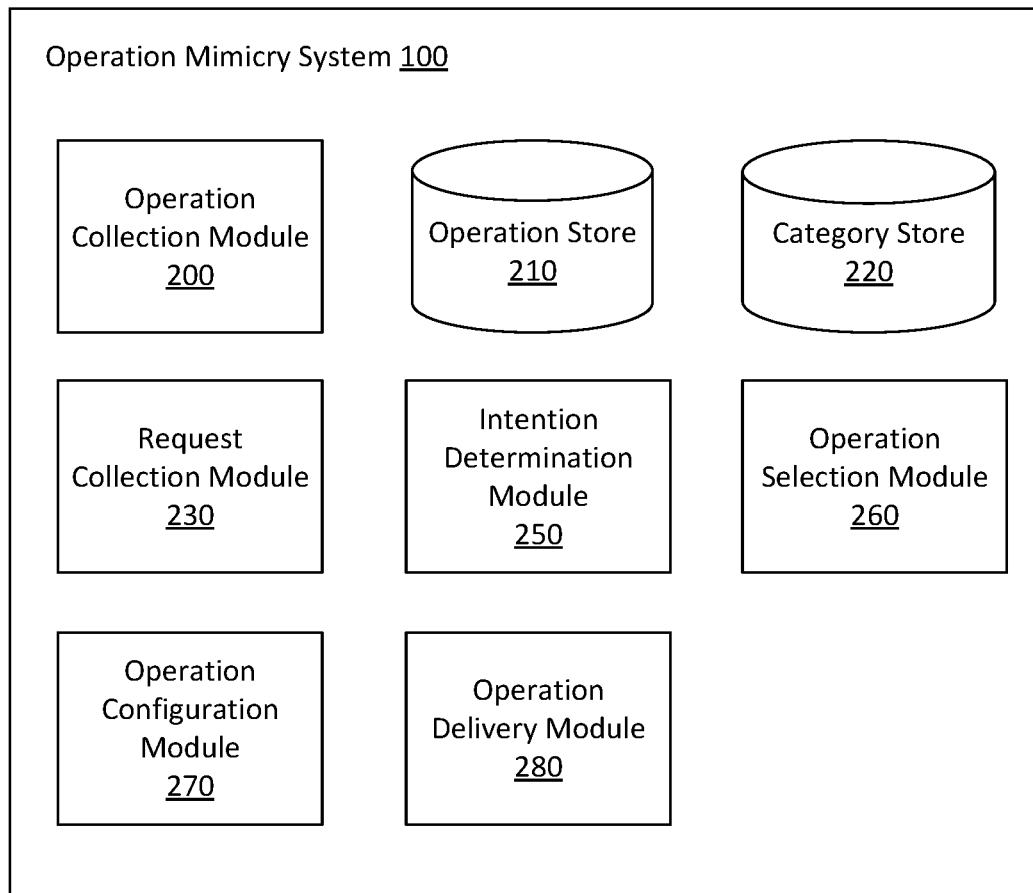
FIG. 2 is a high-level block diagram of a system architecture for the operation mimicry system, according to an example embodiment.

Referring to FIG. 2, it illustrates a high-level block diagram of a system architecture for operation mimicry system 100, according to an example embodiment. Operation mimicry system 100 may include operation collection module 200, operation store 210, category store 220, request collection module 230, intention determination module 250, operation selection module 260, operation configuration module 270, and operation delivery module 280. Operation mimicry system 100 may include additional, fewer, or different components from those shown in FIG. 2 and the functionality of the components as described herein may be distributed differently from the description herein.

Operation collection module 200 may collect sequences of operations that occur on client devices 105. The sequences of operations may be performed by users, performed by automatic application crawling programs, or performed by programs recreating a sequence of logged user touches, according to various embodiments. Sequences of operations can be input via user touches on a touchscreen, voice commands input into a microphone, and user thoughts collected with electroencephalography (EEG) or other brain activity monitoring devices. Collected sequences of operations may be stored and used to construct different sequences of operations in response to subsequent user requests. According to one example embodiment, operation collection module 200 may collect operations from operating system 103 of client device 105 in the form of view-structures and events performed in relation to view-structures. That is, operation mimicry system 100 may store a particular operation as a unique pairing of an event (e.g. button click) and the view-structure in which the event occurred. A "view-structure" may be a data structure containing information about components of a user interface that are rendered by operating system 103 on client device 105. For example, a view-structure can contain information about buttons, content lists, text boxes, and other structural parts of a user interface. An example of such a view-structure may be an xml file. Components of view-structures may contain content, for example, the text displayed within a text box. Events may be actions performed in relation to view-structures and may include user interactions such as clicking on a button, entering text, or swiping on a touchscreen. An event alters the state of the client device 105 such that it changes the content within the current view-structure or presents an interface with a different view-structure. Operation collection module 200 stores collected operations in the operation store 210.

Operation store 210 may store operations and information about sequences of operations. In one embodiment, operation store 210 may contain sequences of operations that operation mimicry system 100 receives from client devices 105. Operation store 210 may include information about how sequences of operations are related to each other and information about the flow of user input through sequences of operations. In addition to being sent from client devices 105, sequences of operations may be programmed directly into operation store 210, or determined using a system that automatically crawls through a user interface and performs events for the purpose of adding information to operation store 210. Operation store 210 is described in further detail with respect to FIG. 6.

Request collection module 230 may receive requests sent to operation mimicry system 100 by users of client devices 105. Requests may be sent to operation mimicry system 100 as text input, voice input via a microphone, or thought input collected using EEG or other brain activity monitoring devices.

Intention determination module 250 may determine the user intentions indicated by user requests. Intention determination module 250 may use natural language processing techniques to separate a user request into terms (i.e., words or phrases) that make up its constituent parts of speech. In one embodiment, the terms of a request are further labeled as "main terms" and "detailed terms". Main terms are terms that indicate an action the user wants operation mimicry system 100 to perform (i.e., verbs), and/or terms that indicate an item upon which the user wants operation mimicry system 100 to perform an action (i.e., nouns). The detailed terms are terms that represent attributes of a main term. For example in a user request to "Buy a new mystery novel," the main terms might be "buy" and "novel", and the detailed terms "a", "new", and "mystery" are attributes about the type of novel the user wants to purchase. In some cases, main terms may relate to an application (i.e., a software application) that can be used to accomplish a task and detailed terms may relate to user input that can be provided to the application to specify the task. For example, main terms "buy" and "novel" may suggest that a book-buying application should be used, and detailed terms "new" and "mystery" could be input into a search field in the book-buying application to find a new mystery novel for purchasing.

Main terms may be mapped to domains. A domain is a set of known terms that are related to each other in that they may imply that certain applications should be used to complete a task. Detailed terms may be mapped to entities. An entity is a category that detailed features may be associated with. For example, a category tree may be used to find the entity of a noun by searching for more general terms in the category tree (e.g., an entity of the term "sushi" is "food"). Entities may also be identified for detailed terms that are not nouns such as adjectives, adverbs, and clauses.

Category store 220 stores information that maps terms to individual operations or specific sequences of operations. In one example embodiment, the terms may be stored such that specific terms are stored in relation to related terms that are more general in scope (e.g., as child nodes and ancestor nodes in a tree data structure). Terms in category store 220 are mapped to applications or to operations executed within specific applications that perform a task described by the term. For example, if a request is "buy book," a search of category store 220 for the terms "buy" and "book" might come up with references to applications through which a user can purchase a book. In some embodiments, category store 220 stores mappings of main terms to known domains and stores mappings of detailed terms to known entities. Specific domains and entities may indicate applications from which operations should be selected to complete a task.

Operation selection module 260 determines sequences of operations that may satisfy the intentions expressed in the user requests. Operation selection module 260 searches for the main terms and detailed terms in category store 220 to find a mapping between the terms from the user request and sequences of operations that may be able to accomplish the requested tasks. As one possible example, a mapping may include a match between a user request term and a word identified in a view-structure of an operation in a sequence. Operation selection module 260 can also construct a new sequence of operations based on the terms. In some embodiments, operation selection module 260 identifies multiple sequences of operations that may be used in a particular situation. To select which sequence of operations to transmit to operating system 103, operation selection module 260 may rank the multiple sequences of operations based on a function of how similar detailed terms and main terms associated with the intention are to detailed terms and main terms associated with the sequences of operations. In some embodiments, the multiple sequences of operations may be ranked based on user rating and usage information (e.g., based on the number of times users have executed a particular sequence of operations in the past). In other example embodiments, a set of sequences of operations that has been determined to be relevant to a user's request may be displayed on a client device 105 for the user to manually select a particular sequence of operations for the system to execute.

Operation configuration module 270 configures sequences of operations to use content that is specific to particular user requests and prepares the sequence of operations for delivery. Examples of specific content include information for filling out text fields, check boxes, or text messages. In some embodiments, operation configuration module 270 may additionally determine operations in the sequence of operations that are not essential to completing the request, or which can be executed without actually rendering a corresponding user interface on client device 105.

Operation delivery module 280 may deliver the sequence of operations to client device 105. Operation delivery module 280 may provide the sequence of operations to client device 105 where it is executed by operating system 103.

User Interfaces

Figure 3B:
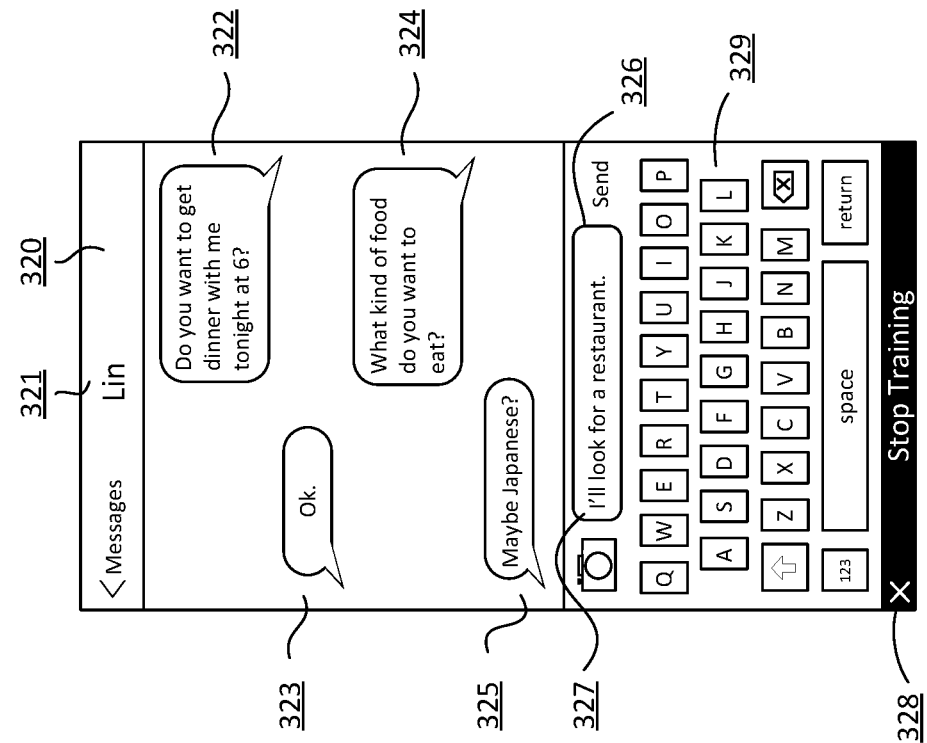
FIG. 3B is an example user interface depicting part of a sequence of operations, according to an example embodiment.
Figure 3A:
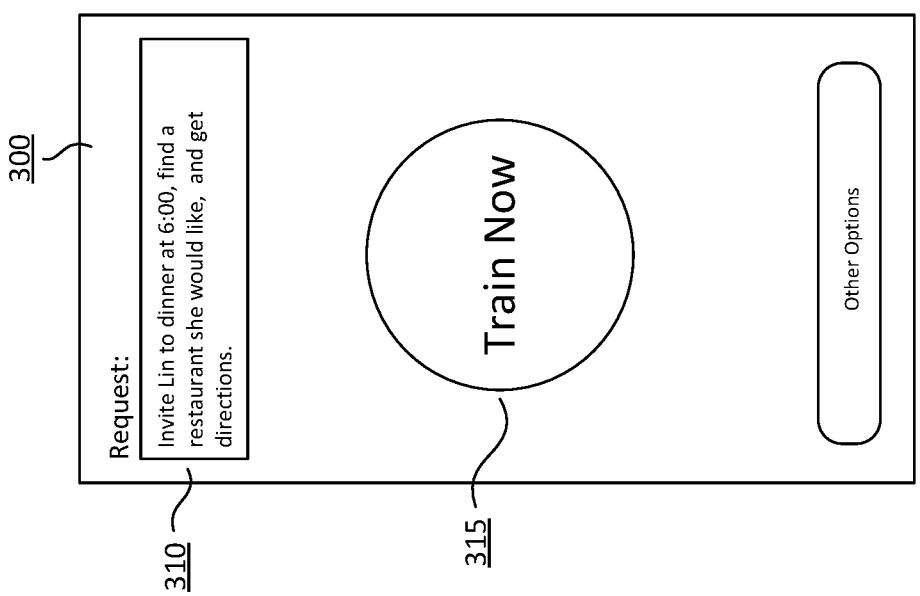
FIG. 3A illustrates a user interface for teaching a new sequence of operations to the operation mimicry system, according to an example embodiment.

FIG. 3A illustrates a user interface for teaching a new sequence of operations to operation mimicry system 100, according to an example embodiment. Training interface 300 comprises text field 310 for entering a user request and training commencement button 315. Selection of the training commencement button 315 provides an indication that a sequence of operations for responding to the user request in text field 310 is beginning. During training, operation mimicry system 100 may receive information about the sequence of operations that is being performed by the user via one or more applications on client device 105. In some example embodiments, operation mimicry system 100 may commence training without receiving an explicit indication that training is beginning, for example, when a training session receives input from an automatic application crawler program rather than manually from a user.

FIG. 3B is an example user interface depicting part of a sequence of operations, according to an example embodiment. Accordingly, FIG. 3B shows messaging application 320 that the user uses to communicate with another user 321 (e.g. "Lin"). The user interface includes all components of messaging application 320, such as keyboard 329 and text entry field 326. The user interface further includes training discontinuation widget 328, such as a button. According to one example embodiment, training discontinuation widget 328 is available throughout the training process. Interacting with training discontinuation widget 328 (e.g., by clicking on it) indicates that the sequence of operations corresponding to the user request is complete, and that operation mimicry system 100 should not continue to collect operations performed by the user. The sequence of operations represented by FIG. 3B may include individual operations of sending text messages. As one operation, the user sends the message, "Do you want to get dinner with me tonight at 6?" to another user 321 (i.e., Lin). The other user 321 responds, with message 323 that indicates a willingness to go to dinner (i.e., "Ok."). The user performs another operation by sending message 324, "What kind of food do you want to eat?" and the other user 321 replies, here with message 325 "Maybe Japanese?". FIG. 3B depicts the user in the process of performing another operation, that is, entering message 327 "I'll look for a restaurant." into text entry field 326, and sending it to Lin.

FIG. 3C is an example user interface depicting part of the sequence of operations, according to an embodiment. In the example of FIG. 3C, the user is interacting with restaurant locator application 330. Operations performed by the user with respect to restaurant locator application 330 (e.g., opening the application, entering a search term, or clicking on a button) are included in the same sequence of operations as the operations performed by the user with respect to messaging application 320. In addition to training discontinuation widget 328, the user interface includes the components of restaurant locator application 330, such as search field 331, and result list 333. In the example, the user enters search term 332 "Japanese" into search field 331. Result list 333 displays restaurant options that are related to search term 332. An example of a search result is search result 334 at the top of result list 333, the restaurant "Sushi California".

FIG. 3D is an example user interface depicting part of the sequence of operations, according to an embodiment. In the example of FIG. 3D, the user performs additional operations in the messaging application 320. The user sends a message 342 that suggests a restaurant "Sushi California," the top list result 334 from the result list 333 displayed by the restaurant locator application 330. The other user 321 responds with a message 344 saying "No, I was thinking we could get ramen." The example of FIG. 3D shows the user in the process of performing another operation, that is sending message 345, "I'll look for a ramen restaurant."

Figure 3F:
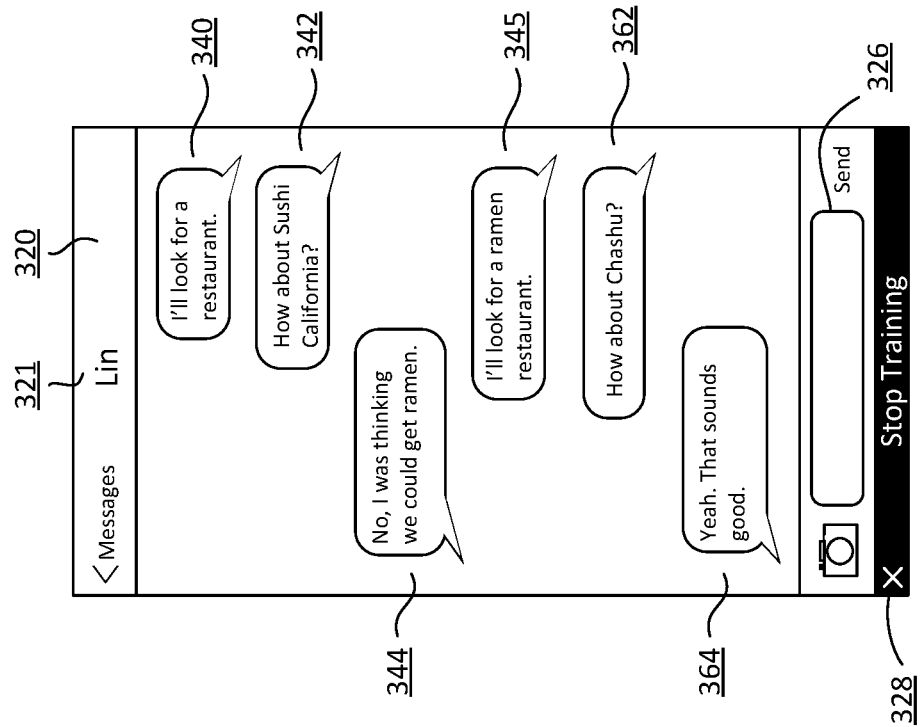
FIG. 3F is an example user interface depicting part of the sequence of operations, according to an example embodiment.
Figure 3E:
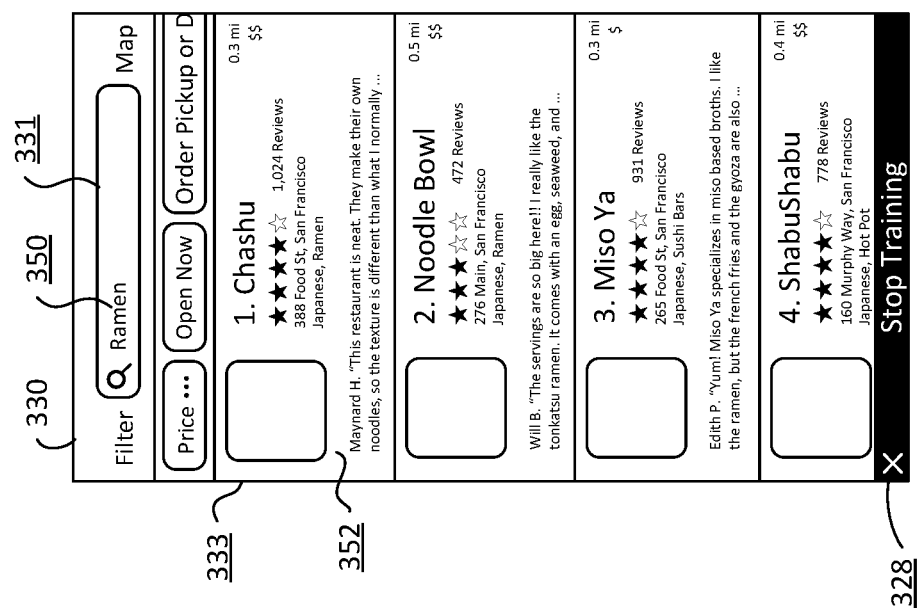
FIG. 3E is an example user interface depicting part of the sequence of operations, according to an example embodiment.

FIG. 3E is an example user interface depicting part of the sequence of operations, according to an embodiment. In FIG. 3E, the user is again performing operations in restaurant locator application 330. The user searches for search term 350 "Ramen". Results list 333 displays top result 352, representing a ramen restaurant called "Chashu".

FIG. 3F is an example user interface depicting part of the sequence of operations, according to an embodiment. In FIG. 3F, the user is again performing operations with messaging application 320. The user sends message 362 to the other user 321, asking if the restaurant "Chashu" would be an acceptable place to eat, and the other user 321 replies 364 that it is.

Figure 3G:
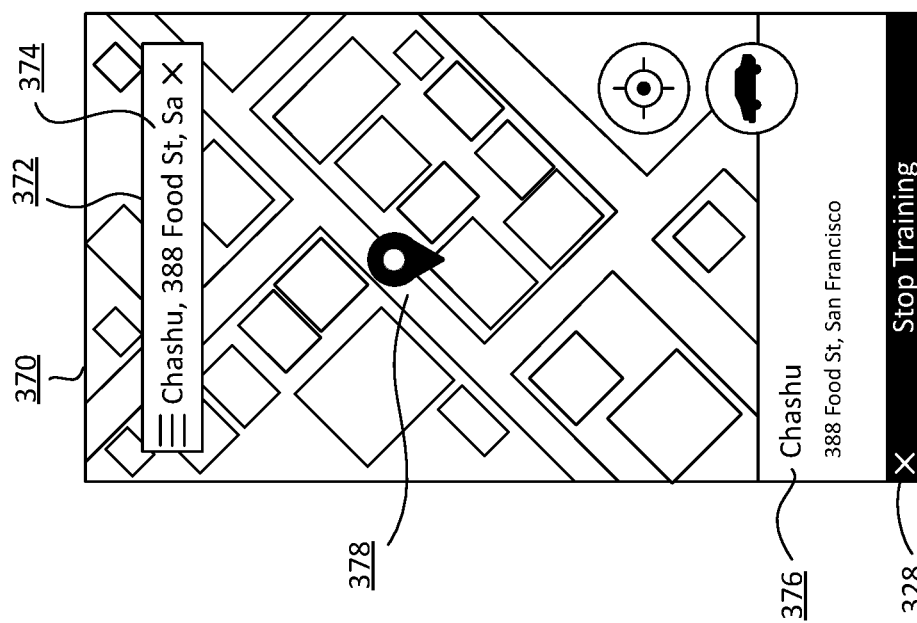
FIG. 3G is an example user interface depicting part of the sequence of operations, according to an example embodiment.

FIG. 3G is an example user interface depicting part of the sequence of operations, according to an embodiment. In the example of FIG. 3G, the user is performing operations on mapping application 370. In addition to training discontinuation widget 328, the user interface includes components of mapping application 370, such as text field 372, location marker 378, and information box 376. The user enters the address of the restaurant, obtained from restaurant locator application 330, in the text field. The mapping application places marker 378 at the location on a map, and provides additional information in information box 376. The user clicks on training discontinuation widget 328 to indicate that the sequence of operations corresponding to the request entered in text field 374 is complete.

In one embodiment, interfaces for training new sequences of operations to operation mimicry system 100 may offer users an option to make manual changes to a sequence of operations as it is stored by operation mimicry system 100. For example, a user interface may present a user with a detailed summary of one or more operations in a recorded sequence of operations (e.g., a sequence of operations the user has just recorded). The user may be presented with options for instructing the system to perform sequences in loops or to perform certain sequences of operations based on conditional states of client device 105. For example, a user might record a sequence of operations for finding a restaurant and inviting a friend to dinner. The user may then manually add a condition that if the restaurant is "Noodle Bowl", then the sequence of operations does not need to include operations for navigating to the restaurant, for example, because the user is a regular customer at "Noodle Bowl", and already knows how to get there.

Figures 4A, 4B:
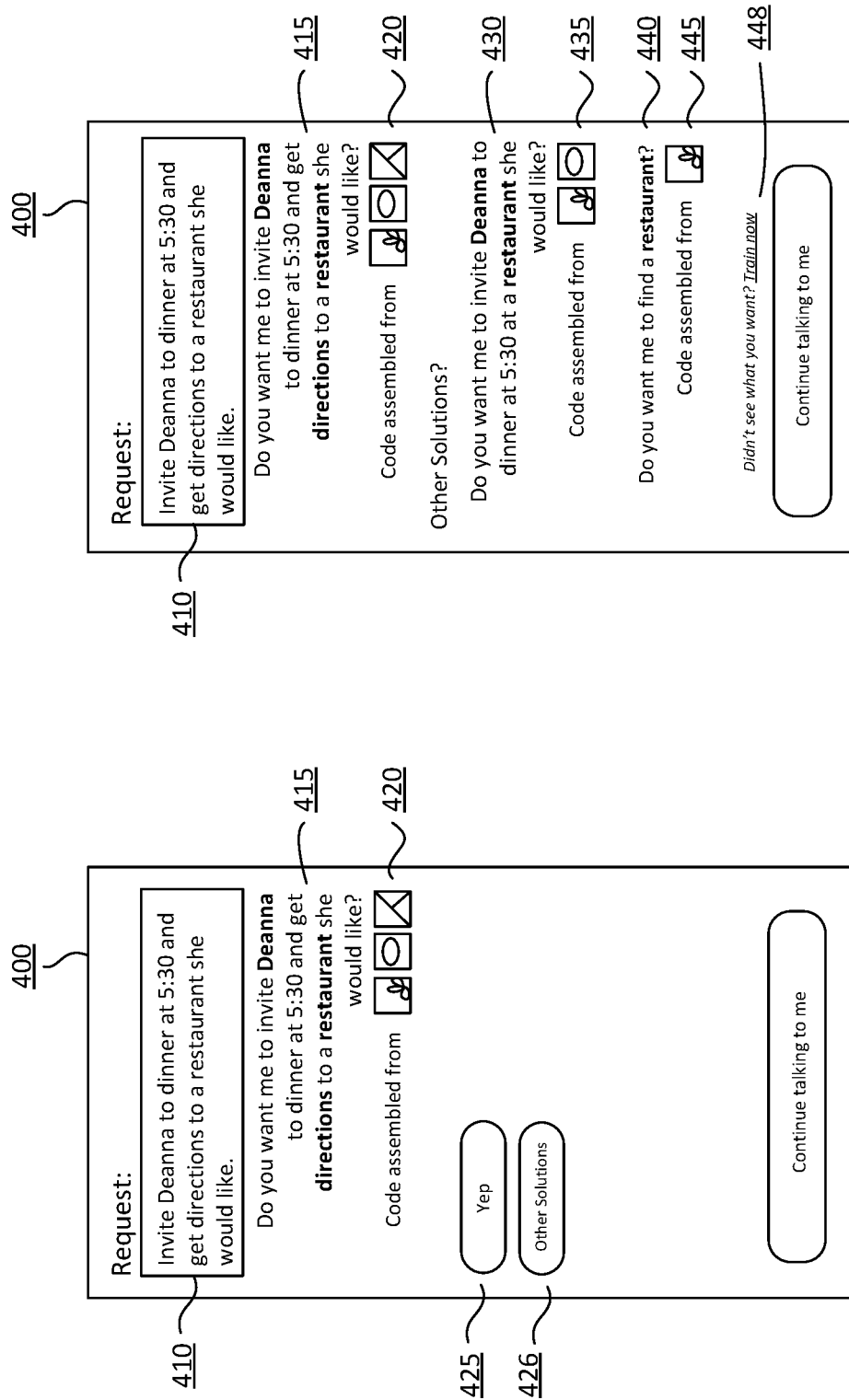
FIG. 4A illustrates an example user interface for requesting a sequence of operations, according to an example embodiment.
FIG. 4B illustrates an example user interface for requesting a sequence of operations, in which a user has requested alternate solutions, according to an example embodiment.

Referring to FIG. 4A, it illustrates an example user interface for requesting a sequence of operations, according to an embodiment. User interface 400 of the example in FIG. 4A includes text field 410 for entering a request, response query 415, code assembly description 420, acceptance button 425, and alternate solutions button 426. The user enters a user request in text field 410. In some embodiments, the user request can be input using voice or brain monitoring techniques, such as EEG. Response query 415 summarizes the sequence of operations that operation mimicry system 100 determines based on the user request, and asks the user to confirm the sequence of events before they execute. Code assembly description 420 provides information about which applications will run to complete the sequence of operations. For example, a messaging application, a restaurant locator application, and a mapping application were used to complete the sequence of operations illustrated in FIG. 3A-G. The user can click on acceptance button 425 to begin executing the sequence of operations on operating system 103, or the user can click on alternate solutions button 426 to receive different sequences of operations from operation mimicry system 100.

FIG. 4B illustrates an example user interface 400 for requesting a sequence of operations, in which a user has requested alternate solutions, according to an embodiment. In response to the user clicking on alternate solutions button 426, the user interface displays summary 430 and code assembly description 435 for a first alternate solution, and summary 440 and code assembly description 445 for a second alternate solution. User interface 400 can also include widget 448 for initiating a training process to teach a new sequence of operations to operation mimicry system 100, as was described in FIG. 3A-G.

Figure 4C:
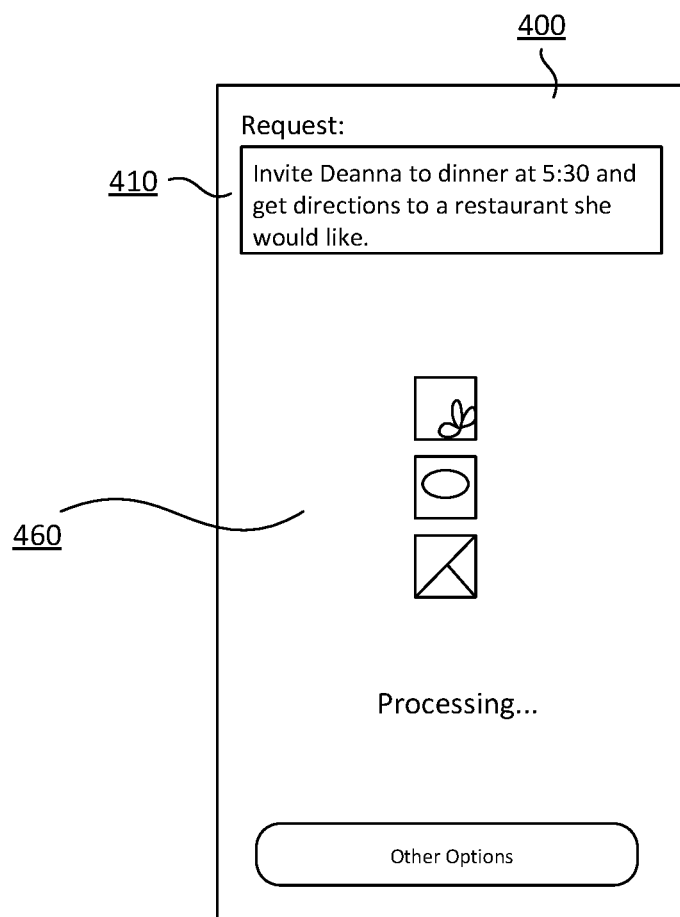
FIG. 4C illustrates an example user interface that appears when a user accepts a sequence of operations.

FIG. 4C illustrates an example user interface 400 that appears when a user accepts a sequence of operations. A list 460 of applications that are used to execute the sequence of operations is displayed while operating system 103 executes the operations. In one embodiment, user interfaces associated with some or all operations in the sequence are rendered to the screen of client device 105 while the operations execute. In one embodiment, an operating system of operation execution system 140 executes the operations and the results of the operations are sent to client devices 105 for display to users.

Operation Collection

Figure 5:
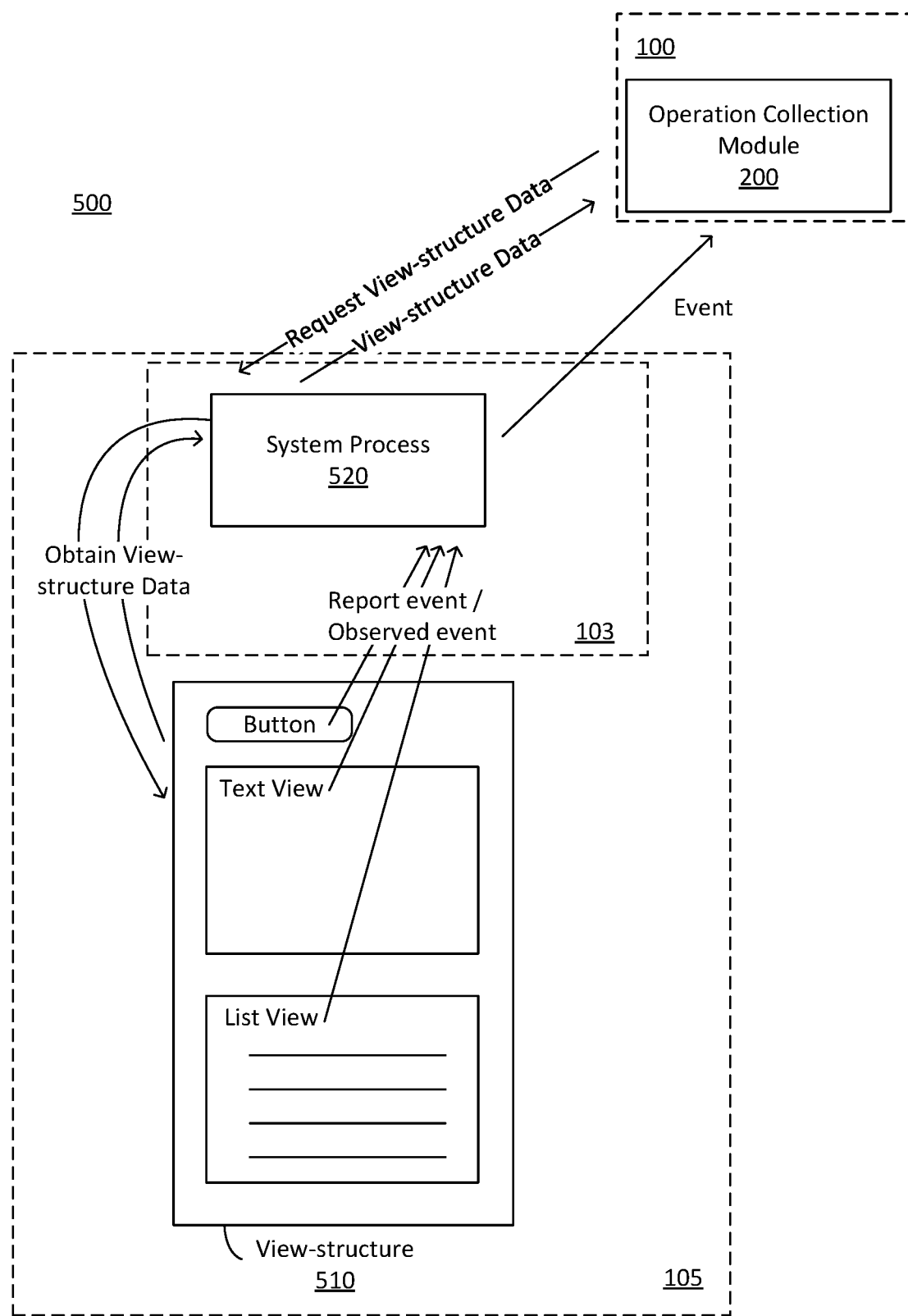
FIG. 5 illustrates an environment for obtaining data for each operation, for example through an operation collection module, according to an example embodiment.

FIG. 5 illustrates an environment 500 for obtaining data for each operation, for example through operation collection module 200, according to an example embodiment. The environment 500 includes operation mimicry system 100 and client device 105. Operating system 103 on client device 105 manages the hardware and software resources of client device 105. For example, operating system 103 handles any processes associated with running applications on client device 105. According to one example embodiment, a process is one or more instances of a computer program (e.g., an application, which is program code comprised of one or more instructions) that is executing on operating system 103. Operating system 103 may also manage other computing functions such as rendering user interfaces 510 to a screen of client device 105. The information in a user interface 510 comprises a view-structure and content contained within the components of the view-structure (e.g., text in a text view component). For example, as depicted in FIG. 5, a view-structure may (e.g., a data structure such as an xml file) and may include components, for example, software buttons, graphical views, text views, and/or list views. Additional content may be associated with the components of a view-structure. For example, a list view component might be associated with a list of strings of text provided for display to the user in the list view part of the user interface 510.

System process 520 collects view-structure data and content associated with components of the view-structure when an event occurs. View-structure data may include information about interface components stored in the view-structure and instructions for an operating system 103 for rendering the view-structure to a screen of a client device 105 or otherwise configuring the view-structure for use by a client device 105. View-structure data may also include information about which components of a view-structure store content, instructions for retrieving content from the view-structure, and instructions for initializing content within components of the view-structure. The data is transmitted to operation mimicry system 100. System process 520 may further collect event data. An event occurs when a user interacts with client device 105 via a user interface 510 (i.e., interacts with a component of a view-structure). An event also may occur when a user interacts with client device 105 using hardware controls, such as hardware buttons or switches, that allow the user to alter the state of client device 105 (e.g., by transitioning to a different user interface or by entering content into a text field). The event is reported to or observed by system process 520.

System process 520 may transmit information about the event to operation collection module 200 of operation mimicry system 100. For example, system process 520 may alert operation collection module 200 that a button was selected (e.g., mouse click or touch sensitive display tap). Operation collection module 200 requests the view-structure data and related content data associated with the event from system process 520. System process 520 may retrieve the view-structure data, event data, and content associated with components of the view-structure and provide the information to operation collection module 200. View-structure data, and event data may include instructions and/or commands for executing the view-structure or event on the operating system. Instructions for executing an operation may be specific to the particular operating system of a device. In this way, operation collection module 200 may collect an operation comprising the event and the view-structure (including content associated with components of the view-structure).

In some example embodiments, operations may be preprogrammed into the operation mimicry system 100. That is, a developer or system administrator may include information about view-structures, events, and other system processes. Such preprogrammed operations, and similarly preprogrammed sequences of operations, may be used in conjunction with operations collected by the operation collection module 200.

Figure 6:
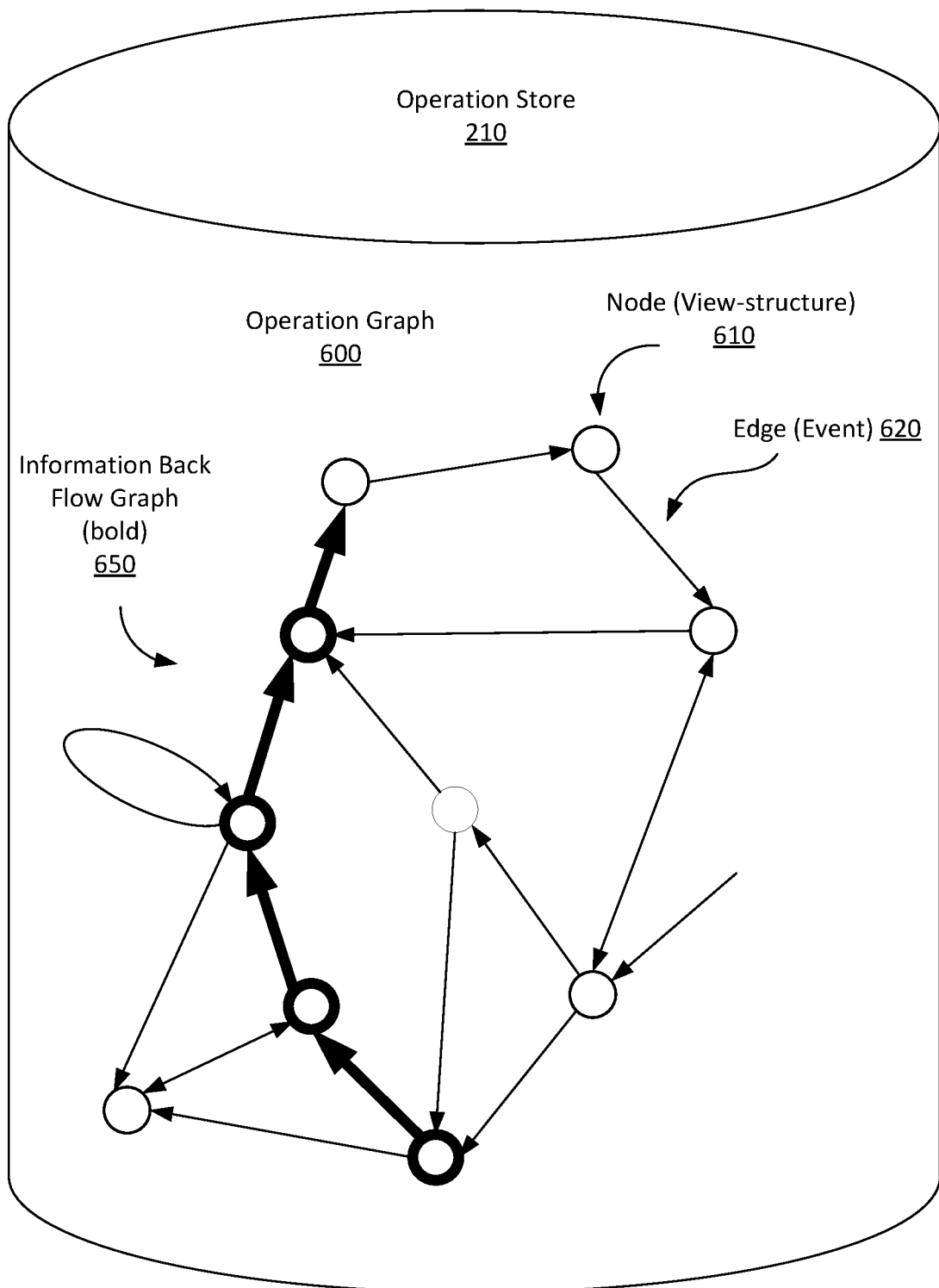
FIG. 6 is a representation of how operations are stored within an operation store, according to an example embodiment.

FIG. 6 is a representation of an example way that operations are stored within operation store 210, according to an example embodiment. An operation comprises a view-structure and an event associated with the view-structure (e.g., clicking on a button and causing a new screen to appear). According to one example embodiment, operations are stored in operation store 210 as components of operation graph 600 (e.g., in a directed graph data structure), a small example portion of which is depicted in FIG. 6. A node 610 in operation graph 600 represents a view-structure associated with one or more operations. According to one example embodiment, a view-structure, as stored in node 610 of the directed graph data structure, includes information about how operating system 103 renders an associated user interface on client device 105 (e.g., the components of the view-structure). For example, information about software widgets, buttons, images, and layouts of a user interface can be stored in a tree data structure within node 610 of the directed graph.

An edge 620 in the directed graph data structure represents an event that causes a client device to transition between view-structures, and may also store information about the event. The direction of an edge 620 indicates the direction of the transition between the view-structures. That is, an event occurs in the view-structure associated with the node at the beginning of edge 620 and results in the view-structure toward which edge 620 is pointing. As a node 610 in the operation graph 600 may be a source of multiple edges, node 610 can correspond to multiple operations. For example, if node 610 represents a view-structure with two buttons, then the node may be associated with two operations (e.g., the operations associated with the two button selection (e.g., click or taps) events). Accordingly, the operation graph 600 may include two edges, representative of the two button selection events, that extend from the node 610. It is also possible for an event to change a view-structure's content rather than transitioning to a new view-structure. In such embodiments, an edge 620 in operation store 210 may point back to the node 610 from which it originated. In other example embodiments, operation store 210 may store individual sequences of operations in relation to that request that is associated with the sequence of operations and without connecting individual sequences to each other in an operation graph 600.

In some example embodiments, operation store 210 may additionally include information-back-flow graph 650. Information back flow graph 650 (a portion of which is shown in bold in FIG. 6) comprises operations from the operation graph 600 that include user input. In some embodiments, information back flow graph 650 may be a separate graph of operations stored in addition to operation graph 600. In some embodiments, information back flow graph 650 may be represented in the operation store 210 as annotations associated with the individual nodes and edges within operation graph 600. Information back flow graph 650 is made up of paths that trace the flow of information input by a user through a sequence of operations. Nodes and edges in a path of information back flow graph 650 may be those nodes and edges that represent view-structures and events that include text or related data (or other changeable input) originally entered by the user. For example, a path through information back flow graph 650 may begin at a node with a search field in its associated view-structure. The text entered into the search field by the user may appear in subsequent views, such as in situations when the application provides suggestions based on the search term. Each of the nodes and edges connecting these subsequent views form a component of information back flow graph 650. Each path through information back flow graph 650 may be signified by an edge that represents the first event that involves the user input but does not lead to a node that includes the user input data. Such an edge is referred to herein as a "disappearing edge".

As operation collection module 200 collects additional operations over time, and stores them in operation store 210, operation graph 600 can grow and change. For example, when an event that has not been previously received by operation mimicry system 100 is performed such that it transitions between two existing nodes 610 in operation graph 600 a new edge 620 is added connecting the nodes 610. Similarly, an operation involving a view-structure that is not already stored in operation graph 600 may introduce a new node 610 to operation graph 600. When a sequence of operations is added to operation graph 600, edges and nodes that involve user input may be identified. The identified operations may be added to information back flow graph 650 (as a node-edge pair). In some embodiments, operation store 210 additionally stores metadata about edges and nodes that are a part of information back flow graph 650, for example, in an accompanying data table. The additional information may include an identification of the specific edge or node, a request that the associated operation was used to complete, domains associated with the operation, entities associated with the operation, and/or one or more detailed features associated with the operation.

In some embodiments, operations from distinct applications can be connected in the operation graph 600 via a sequence of operations that a user might use to manually navigate to a new application. For example, on some client devices 105, it is possible to return to a "home" screen interface of client device 105 from within any application through selection made via a hardware switch and/or a display rendered software user interface switch (e.g., button or toolbar) on the client device 105. Returning to a home screen is an example of an operation. In such cases, every node 610 in operation graph 600 may have a protruding edge that points to a node that represents the home screen view-structure. Some operating systems 103 may have alternate or additional schemes for switching between applications such as via a menu screen, or using system commands. In one embodiment, operation store 210 stores a different operation graph 600 for each different operating system 103 that operation mimicry system 100 supports. Edges (or sequences of operations) connecting operations from different applications in operation graph 600 may be dependent on the scheme which the relevant operating system 103 uses to switch between operations.

Intention Determination

Figure 7:
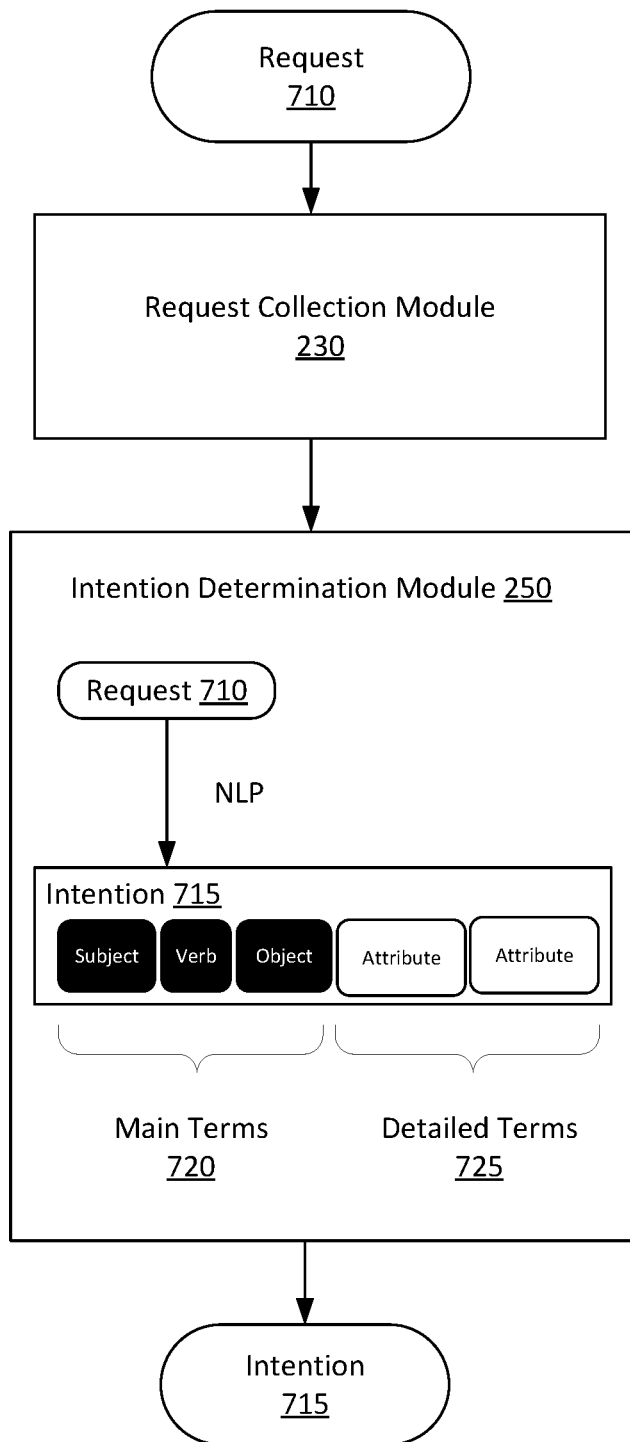
FIG. 7 illustrates a high-level block diagram of a process for determining a user intention in response to a request to perform a sequence of operations, according to an example embodiment.

Referring now to FIG. 7, it illustrates a high-level block diagram of a process for determining a user intention in response to a request to perform a sequence of operations, according to an example embodiment. Request 710 is received by request collection module 230. Request collection module 230 may transmit request 710 to intention determination module 250 for analysis.

A user intention generally refers to the concept, idea, or commands that may be implied by a user's input to the operation mimicry system 100. Intention determination module 250 may use natural language processing techniques to separate request 710 into component parts of speech. According to one example embodiment, natural language processing techniques also may be used to label some or all of the component parts of speech as main terms 720 or detailed terms 725. Main terms 720 include subjects, verbs and objects. Detailed terms 725 include attributes (e.g. adverbs, and adjectives) that describe the main terms 720. An intention 715 may comprise a set of main terms 720 and detailed terms 725 extracted from request 710.

Operation Sequence Determination

Figure 8:
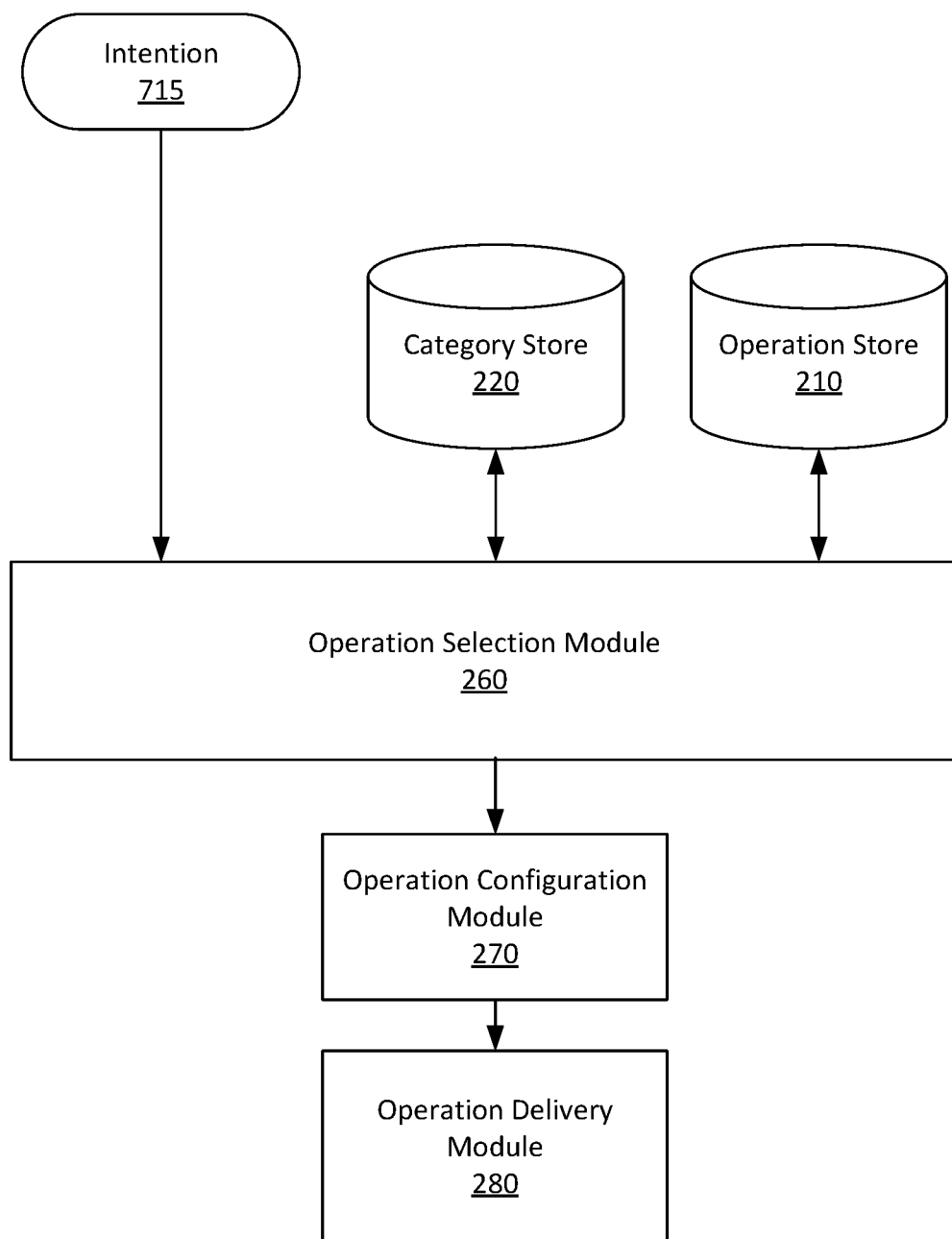
FIG. 8 is a high-level block diagram illustrating a method of determining an appropriate sequence of operations to execute in response to a user request, according to an example embodiment.

FIG. 8 is a high-level block diagram illustrating a method of determining an appropriate sequence of operations to execute in response to a user request, according to an example embodiment. Operation selection module 260 performs a search in category store 220 for one or more main terms 720 of intention 715. In one embodiment, main terms 720 and information about main terms 720 stored in the category store 220 are used to determine a domain that is related to intention 715. An entity related to detailed terms 725 may additionally be determined.

In one embodiment, each node in category store 220 may contain information about one or more detailed terms 725 that are related to the main term 720 with which the node is associated. For example, a node in category store 220 associated with the main term "restaurant" might contain information about detailed terms that can describe restaurants such as "ramen" and "expensive". Operation selection module 260 identifies the detailed term 725, which corresponds to the main term 720 of the intention 715, within the node. Operations or sequences of operations, stored in operation store 210 that can accomplish the task described by the terms (i.e., from the user request) may be selected based on particular domains and entities to which main terms 720 and detailed terms 725 are mapped. For example, main terms 720 "find restaurant" and the detailed term 725 "sushi" may be mapped to a domain of restaurant locator applications and an entity "food type" and these mappings may suggest a sequence of operations, stored in operation store 210, that uses a restaurant locator application with a function for searching for different types of food. In some cases, multiple relevant sequences of operations may be selected in response to one request. Such sequences of operations may be connected into an overall sequence of operations by operation selection module 260. Details about using operation graph 600 and information back flow graph 650 to select and construct a sequence of operations from operation store 210 will be elaborated in the descriptions for FIGS. 9-12.

Operation configuration module 270 may tailor the sequence of operations determined by operation selection module 260 to the specific intention 715. Operation configuration module 270 may incorporate instructions about populating content fields within a view-structure, such as text fields and check boxes, into the sequence of operations determined by operation selection module 260. In some embodiments, detailed terms from a user request are used to populate view-structure components that require user input.

According to an example embodiment, operation configuration module 270 additionally removes unnecessary operations or includes instructions to operating system 103 to perform some operations without rendering the associated views to a screen of client device 105. An unnecessary operation is an operation that does not affect the outcome of the sequence of operations (e.g., a view that includes only informational text and may include a "continue" selection (e.g., button)). In one example embodiment, operation configuration module 270 may include instructions to run the sequence of operations on a background process while the user of client device 105 interacts with different applications. In some embodiments, the selected sequence of operations may include operations that require user input. For example, an operation may require the user to enter a password. In such cases, operation configuration module 270 may include instructions for operating system 103 to render certain necessary operations and wait for user input to resume execution.

Operation delivery module 280 receives a sequence of operations from operation configuration module 270, and prepares the sequence of operations for execution on operating system 103 of client device 105 from which the request was received. In one embodiment, operation delivery module 280 converts the sequence of operations into an instruction set that operating system 103 can use to execute the sequence of operations. Operation delivery module 280 may transmit the prepared sequence of operations to client device 105.

The following descriptions of FIGS. 9-12 provide a more detailed overview of a way that sequences of operations may be stored when the operation mimicry system 100 is trained and how new sequences of operations are constructed in response to a user request using the operation graph 600 and information back flow graph 650, as stored in operation store 210. FIGS. 9-12 review the components of a user interface (i.e., "view") and the way that operations are stored in the operation graph 600 with respect to the user interface components. A procedure for building sequences of operations by associating paths from information back flow graph 650 with sections of the operation graph 600 is also described.

Figure 9:
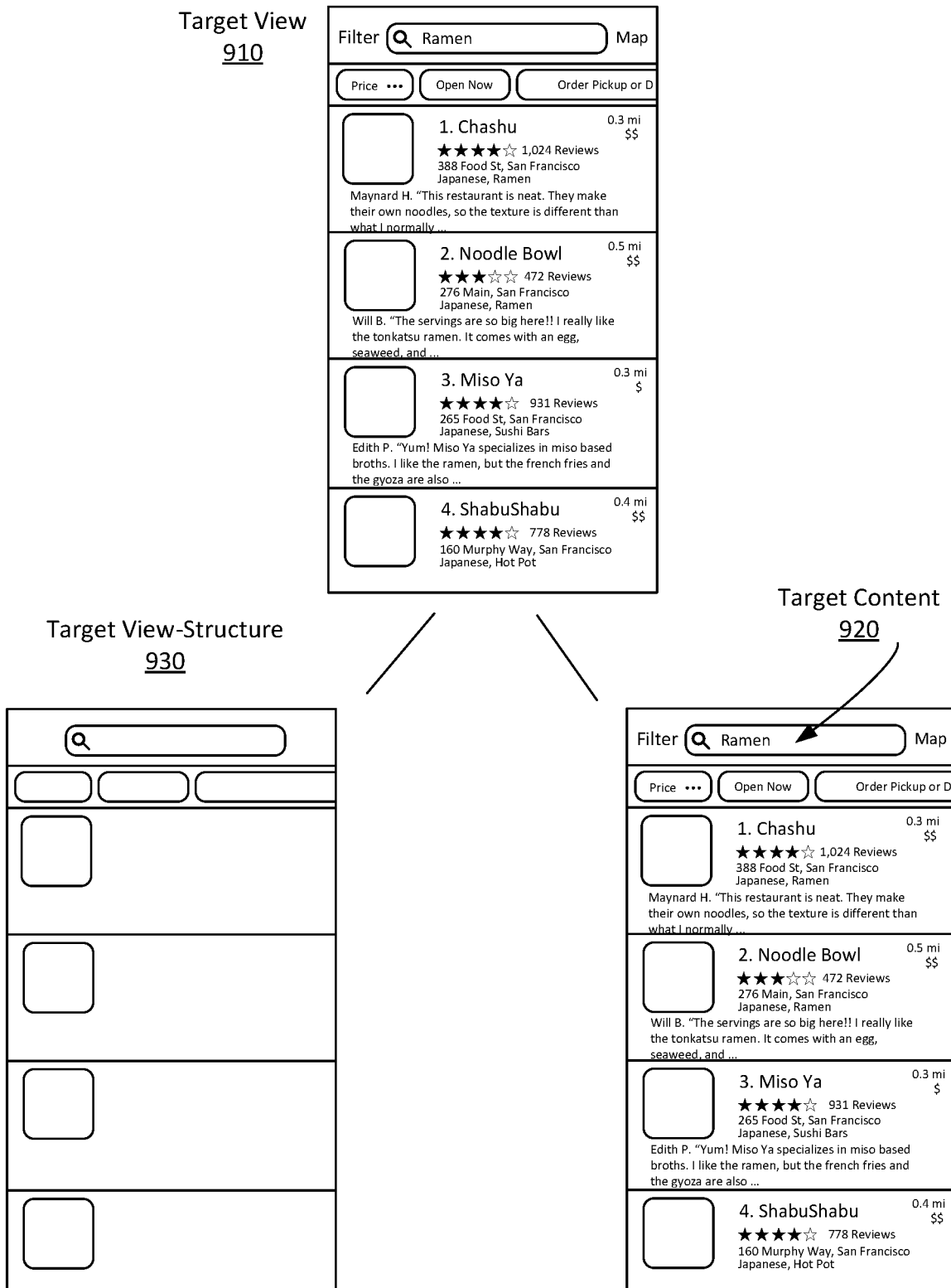
FIG. 9 is an illustration of the components of a target view, according to an example embodiment.

FIG. 9 is an illustration of the components of a target view, according to an example embodiment. A target view 910 may be a specific instance of a user interface that includes a view-structure and content that exists within components of the view-structure. A target view 910, in particular, includes what may herein be referred to as target view-structure 930 and target content 920. A target view 910 may be a particular view-structure and associated content that represent an interface in which a final operation in a sequence of operations that involve a user input value occur. The target view 910 may include target content 920 in the form of user input values, or values based on user input values. For example, in some embodiments, target content 920 may be content input by a user and contained within a part of target view-structure 930 such as text entered in a search bar.

Figure 10:
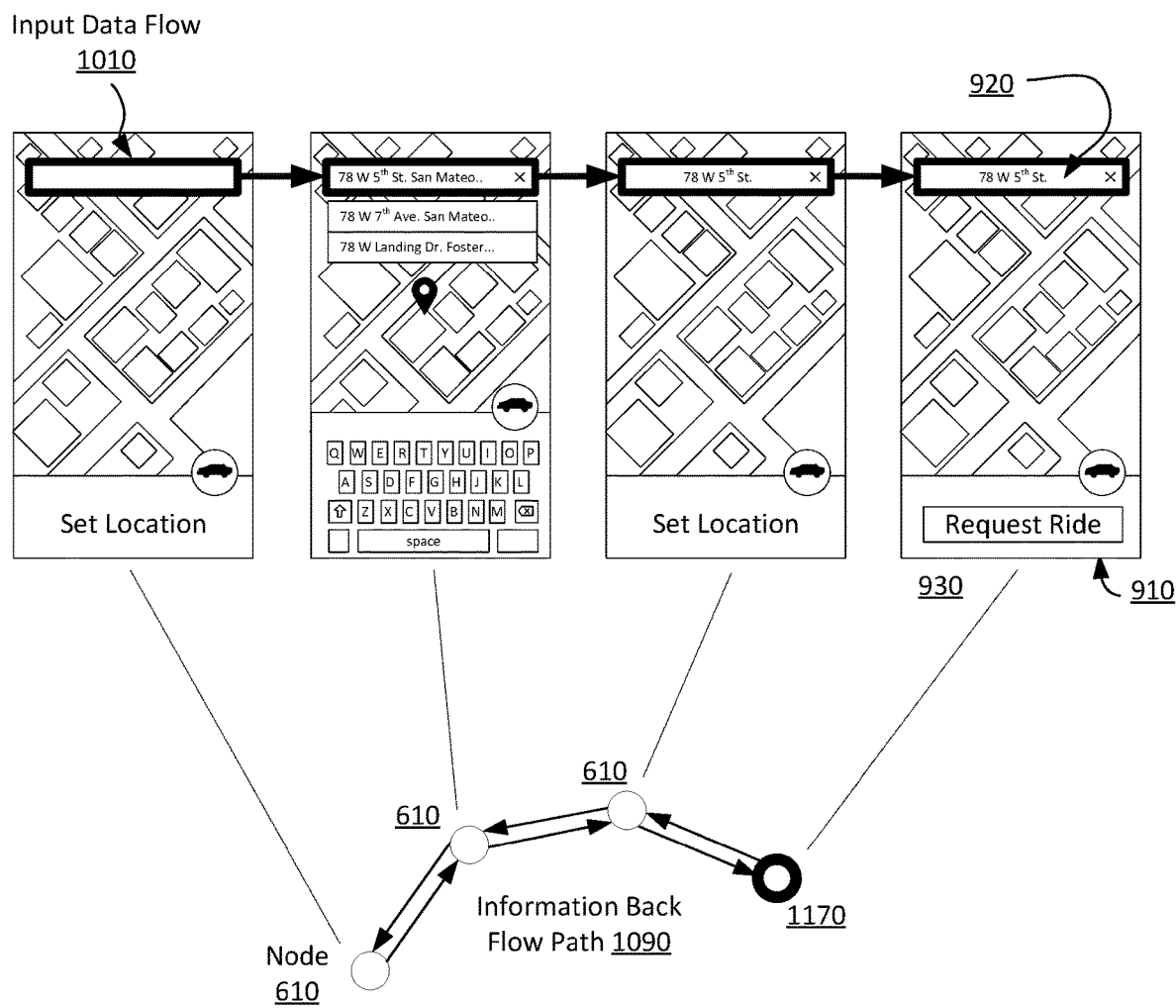
FIG. 10 illustrates an example process for constructing an information back flow path, according to an example embodiment.

FIG. 10 illustrates an example process for constructing an information back flow path, according to an example embodiment. As was previously noted in the description of FIG. 2, information back flow graph 650 may be stored in operation store 210 along with operation graph 600. Generally, information back flow graph 650 represents operations in the operation store 210 that involve user input data. In one embodiment, information back flow graph 650 may be represented as annotations of nodes and edges of operation graph 600 rather than as a completely separate graph. Information back flow graph 650 may be made of one or more information back flow paths 1090. An information back flow path 1090 represents the flow of a piece of user input, i.e., content that is explicitly or implicitly entered or changed by the user or system while interacting with a user interface. In other words, an information back flow path 1090 represents the path of the piece of user input from the view-structure into which a user enters the user input to the target view 910 and associated final event that involve the same user input.

The example of FIG. 10 shows an information back flow path 1090 that describes the flow 1010 of user input data through views of a ride sharing application (location of user input outlined in bold in this example user interface). When operation collection module 200 records a new sequence of operations during training, nodes 610 and edges 620 of operation graph 600 that contain content that originated as input by a user (or machine) when interacting with an application may be included in information back flow graph 650. To generate an information back flow path 1090 for inclusion in the information back flow graph 650, the operation mimicry system 100 reverse-engineers the input data flow 1010 associated with some user input by tracing possible paths for reaching target view 910 for which the user input is target content 920 in reverse order, in accordance with one example embodiment.

For each node 610 that is determined to represent a target view-structure 930 (which may sometimes referred to herein as target node 1170), operation collection module 200 determines a set of nodes 610 from which target nodes 1170 could be reached. Such a determination could be made, for example, by following edges 620 stored in operation graph 600 that lead to the target node 1170 and identifying a set of nodes 610 from which the edges originate. The operation collection module 200 determines whether the user input related to target content 920 is present in each of the nodes 610 in the set. In some embodiments, determining whether the user input is present in the nodes 610 may involve comparing a string representation of the user input against strings of content stored within view-structure elements of each node 610. In some embodiments, determining whether the user input is present in the nodes 610 may involve use of machine learning or natural language processing techniques that can predict whether content in a node 610 is related to the target content 920 in a target node 1170.

If the operation collection module 200 determines that one of the nodes 610 in the set includes user input related to the target content 920, an edge 620 between the target node 1170 and the determined node is included in the information back flow graph 650. To construct a complete information back flow path 1090, the operation collection module 200 iteratively searches for nodes 610 connected to a previous node 610 that was found to include the user input information. This process is repeated until a starting node 610 into which the user input was originally entered is determined (e.g., when a node 610 is determined such that no previous nodes 610 included the user input). Thus, a sequence of operations that represents the flow of the user input data from input to target view 930 is generated for storage in the information back flow graph 650 as an information back flow path 1090. Note that the set of double arrows between nodes 610 in the illustration of information back flow path 1090 represents this way of determining an information back flow path 1090 by tracing backwards through operation graph 600 to generate a forward sequence of operations related to user input.

In one embodiment, metadata about nodes and edges that are added to information back flow graph 650 may be stored in operation store 210. Such metadata may associate operations involving user input (and information back flow paths that include them 1090) with domains, entities, and/or a user request for which the operations were performed.

Figure 11:
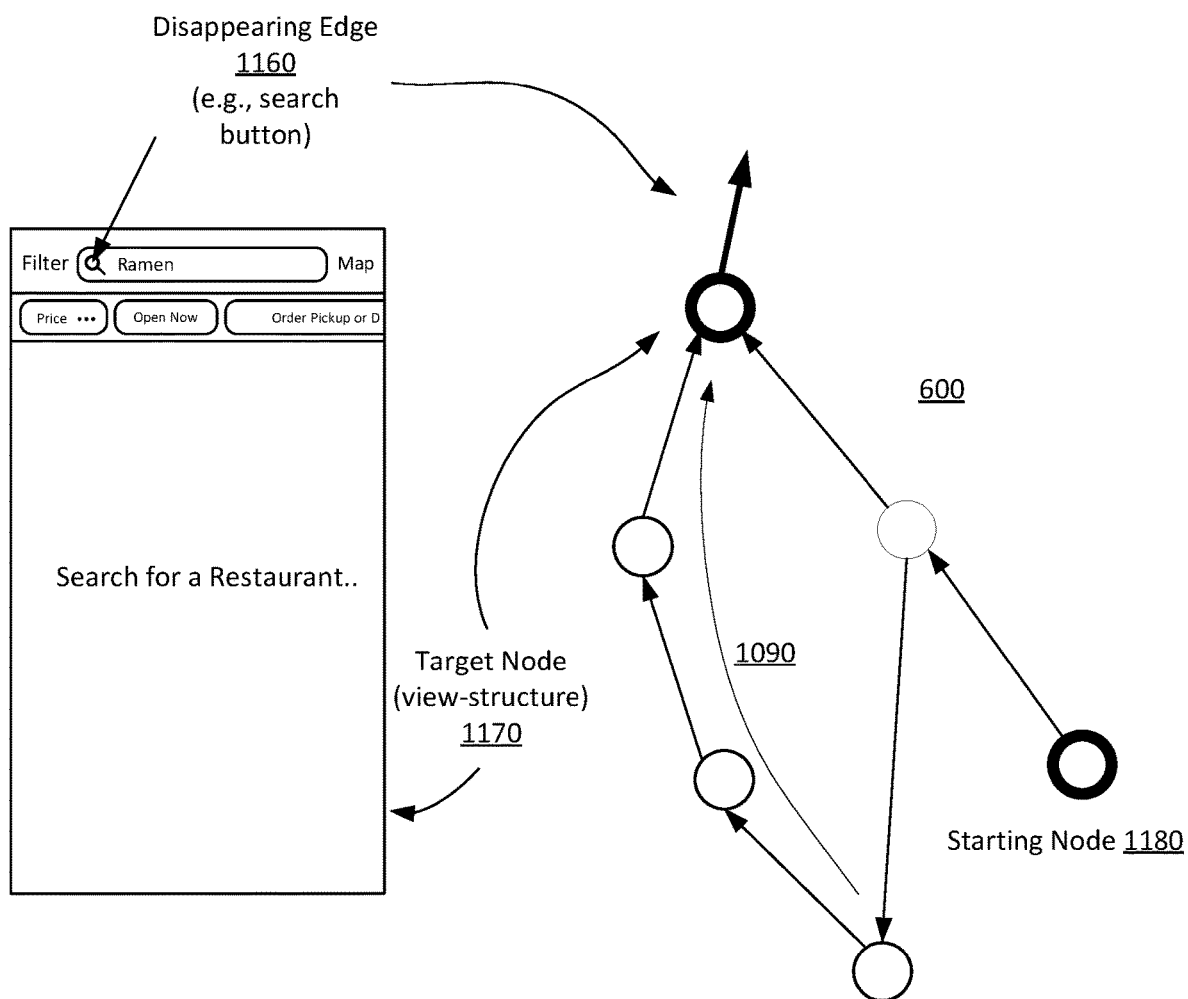
FIG. 11 is an illustration of components that relate an information back flow path to the operation graph, in accordance with an example embodiment.

FIG. 11 is an illustration of components that relate an information back flow path 1090 to the operation graph 600, in accordance with an example embodiment. Specifically, FIG. 11 depicts a disappearing edge 1160, a target node 1170, and a starting node 1180.

A disappearing edge 1160 is an edge that leads away from a node of an information back flow path 1090 from which no other nodes containing the user input of the information back flow path 1090 can be reached. Such disappearing edges 1160 may be added to the end of an information back flow graph 1090 in some embodiments. Thus, a disappearing edge 1160 represents a part of the last operation in an information back flow path 1090, which joins the information back flow path 1090 back into the rest of operation graph 600. For example, a disappearing edge 1160 may represent a button click that enters a user search term into a browser, at which point the browser transitions into a view that shows search results, but no longer shows the user's search input.

A target node 1170 represents a target view-structure 930 for an information back flow path 1090, as was shown previously in FIG. 9. A starting node 1180 may be identified from operation graph 600. Starting node 1180 may represent a view-structure a client device needs to transition through to reach target node 1170. In one example embodiment, starting node 1180 may be a node in operation graph 600 that that is associated with a view-structure of an application into which a user may enter user input. In another example embodiment, starting node 1180 may represent an initial view-structure of an application with which a target node 1170 is associated. For example, if an application was previously closed, starting node 1180 may be a default of home page of the application. If the application was previously opened, opening the application may bring the user to a last seen view of the application, which could likewise be represented by a staring node 1180, depending on the particular instance. Starting node 1180 may not be a part of any information back flow paths 1090, but may be used to reach an information back flow path 1090 from other nodes 610 within operation graph 600.

Figure 12:
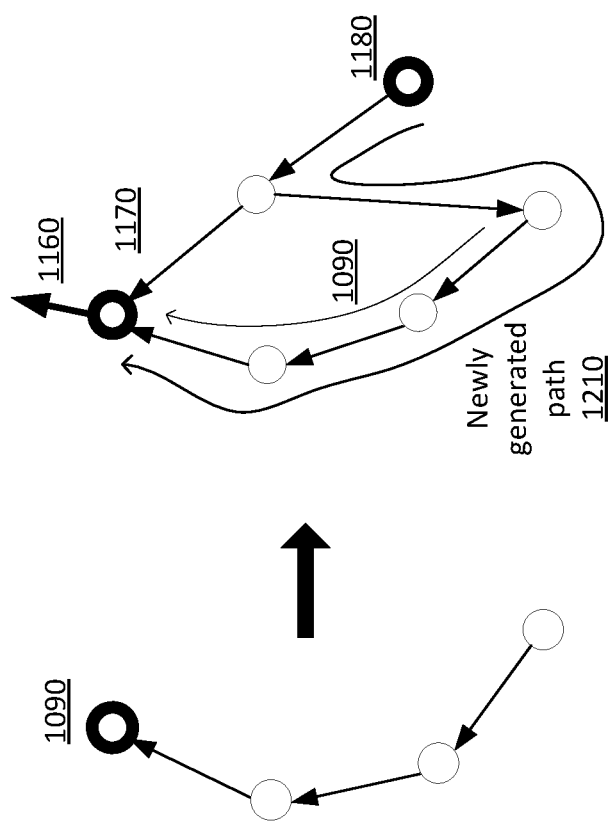
FIG. 12 is an example illustration of how a sequence of operations may be constructed using information back flow paths, according to an embodiment.

FIG. 12 is an example illustration of how a sequence of operations may be constructed using information back flow paths 1090, according to an example embodiment. When a new request is received and processed by operation mimicry system 100, the request may be analyzed by intention determination module 250 to determine main terms 720 and detailed terms 725 of the request. In some embodiments, domains and entities related to main terms 720 and detailed terms 725 are also determined. To determine information back flow paths 1090 for inclusion in the sequence of operations, target nodes 1170 and disappearing edges 1160 (which are associated with information back flow paths 1090) are selected by matching main terms 720 and detailed terms 625 from the new request with main terms 720 and detailed terms 725 that are associated with request metadata stored in information back flow graph 650. In some cases, this process may include determination of a final event for inclusion in an overall sequence of operations, sometimes referred to as a "target edge" which may or may not also be a disappearing edge 1160 in an information back flow path 1090. Matching of terms may be achieved using natural language processing, string comparisons, or other techniques. For example, disappearing edges for use in a new sequence of operations are identified by matching entities associated with detailed terms 725 from the new request with entities associated with detailed terms stored as metadata for nodes and edges in information back flow graph 650.

In some example cases, a sequence of operations that ends with a selected target edge, includes all selected target nodes 1170, and that includes all disappearing edges 1160 and associated information back flow paths 1090 is already stored in operation graph 600. In such cases, operation mimicry system 100 may substitute detailed terms 725 from the request as input into view-structures that require input. Then, the existing sequence of operations can be sent for execution by operating system 103. In some embodiments, operation mimicry system 100 may include pre-programmed sequences of operations for responding to common requests in this way.

If operation graph 600 does not have a recorded sequence of operations that includes a selected target edge, selected target nodes 1170, and selected disappearing edges 1160, operation selection module 160 constructs such a sequence of operations. In some embodiments, operation selection module 260 may identify starting nodes 1180 (as described with respect to FIG. 11) for each application that contains one or more of the identified target nodes 1170, target edge, and disappearing edges 1160. Information back flow paths 1090 that include the selected disappearing edges 1160 are selected from information back flow graph 650. Operation selection module 260 may determine paths in operation graph 600 that connect the selected starting nodes 1180 to their respective information back flow paths 1090 (i.e., information back flow paths that use the same software application as a particular starting node 1180). For example, operation selection module 260 may determine a path 1210 in operation graph 600 that connects starting node 1180 to the identified beginning node of information back flow path 1090, as shown in FIG. 12. A useable sequence of operations has been constructed when a path from a starting node 1180 to the first nodes of one or more information back flow paths 1090, along each of the information back flow paths 1090 to the selected disappearing edges 1160, and finally to a target edge, is determined.

In some embodiments, information back flow paths 1090 included in a sequence of operations may include operations involving user input for which operation mimicry system 100 may substitute detailed terms 725 from the new request. Such detailed term 725 substitutions may function as automatic input when constructing new sequences of operations. For example, a sequence of operations stored in information back flow graph 650 that searches for "sushi" in a search bar of a restaurant locator application might substitute a detailed term 725 "Italian" for the detailed term "sushi" as automatic user input that is relevant to a new request for Italian food.

One or more sequences of operations involving information back flow paths 1090 are constructed by operation selection module 260 for completing all tasks in a user request. Operation selection module 260 may connect the constructed sequences of operations to compile a final overarching sequence of operations that will accomplish all the tasks (including potentially multiple sub-tasks) included in the user request. This may create a path through operation graph 600 that passes through each of the constructed sequences of operations (including along relevant information back flow paths 1090) in an order that may be needed to execute the task.

In one embodiment, operation selection module 260 may append a sequence of operations that occurs in a second application to a sequence of operations that occurs in a first application by including an operation for returning to a home screen of client device 105, as a user would do if the user performed such a sequence of operations manually. For example, this may include appending the operation for opening the second application to the operation for returning to the home screen in order to then include the sequence of operations for the second application.

Overview of Process

Figure 13:
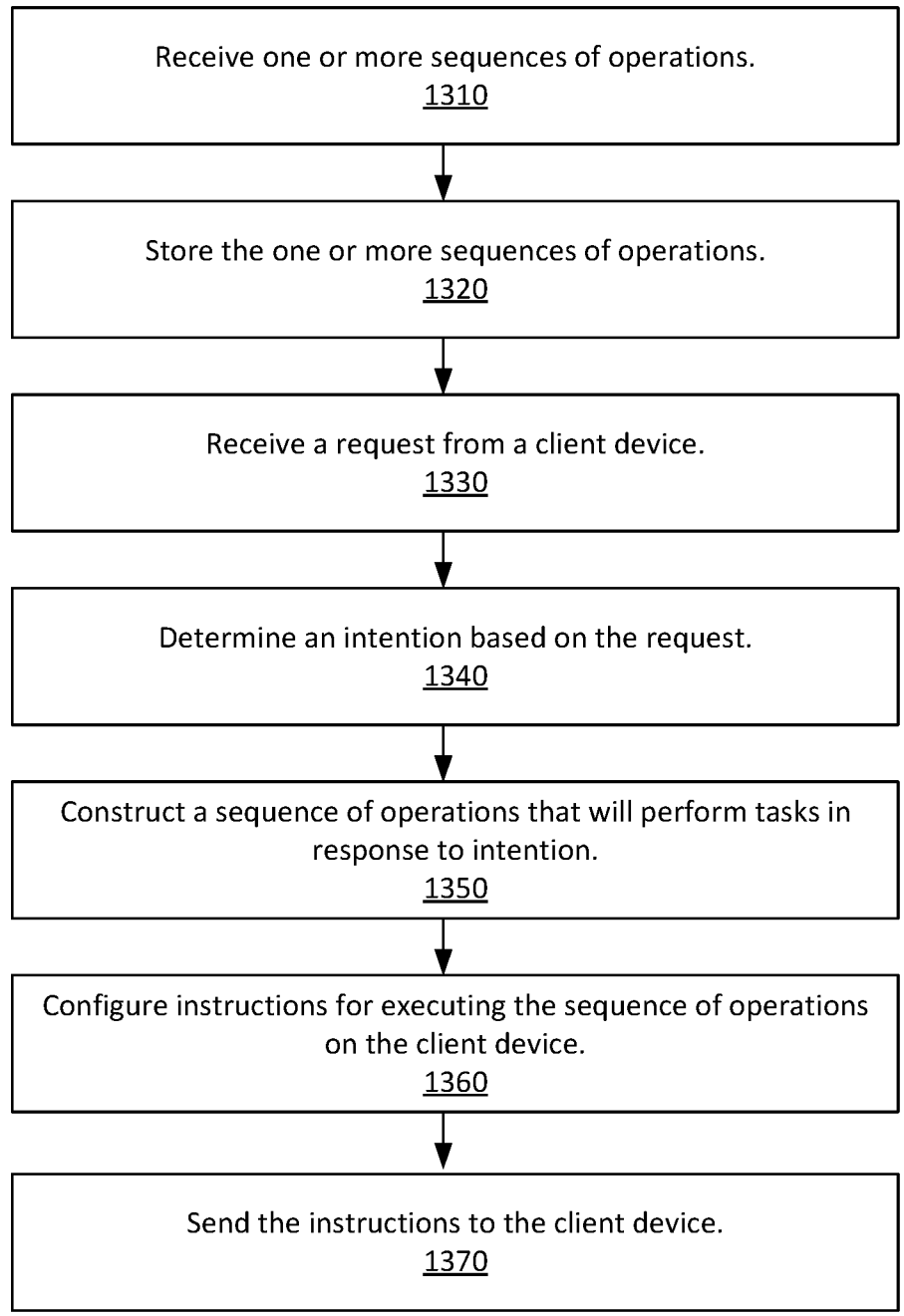
FIG. 13 is a flow chart showing the main steps of a process for determining a sequence of operations in response to a request, according to an example embodiment.

FIG. 13 is a flow chart showing steps of a process for determining a sequence of operations in response to a request, according to an example embodiment. Operation mimicry system 100 receives 1310 one or more sequences of operations. A sequence of operations is performed on client device 105 and transmitted to operation mimicry system 100 over a network 120. In one embodiment, operation mimicry system 100 can receive sequences of operations via uploads from developers. Operation mimicry system 100 stores 1320 the one or more sequences of operations in operation store 210.

Operation mimicry system 100 receives 1330 a request from a client device 105. In one embodiment, requests are submitted by users with natural language input, such as text or voice. Operation mimicry system 100 determines 1340 a user intention based on the received request. Determining the intention related to a request may include using natural language processing techniques to separate the request into its component parts of speech. Operation mimicry system 100 uses information about the determined intention to construct 1350 a sequence of operations that will perform tasks to accomplish the intention. A sequence of operations that satisfies the request is selected from operation store 210. In some embodiments, a new sequence of operations, which is based on operations in operation store 210, is created in response to the request.

Operation mimicry system 100 configures 1360 instructions for executing the selected sequence of operations on client device 105. In some embodiments, such a configuration includes instructions for executing the sequence of operations on operating system 103 of client device 105, instructions for whether all operations in the sequence of operations should be rendered to a screen of client device 105 by operating system 103, and/or removal of operations that have no effect on the outcome of the sequence of operations from the sequence of operations. Operation mimicry system sends 1370 the instructions for executing the sequence of operations to client device 105.

Multi-Step Execution

Operation mimicry system 100 may be configured to send instructions that include function calls and/or calls to APIs as a part of the process of completing an overall task, in accordance with an example embodiment. For example, a sequence of operations may complete one part of a task, while a call to an API returns information that is necessary for another part of the task. Thus an overall task may be logically divided by operation mimicry system 100 into functional units that may execute sub-tasks to complete parts of the overall task. A functional unit may comprise a sequence of operations, an API call, a function call, etc. In an example embodiment, operation mimicry system 100 may use an API call rather than a sequence of operations in cases when the API call can complete a sub-task in fewer steps than the sequence of operations would require to complete the same sub-task.

Figure 14:
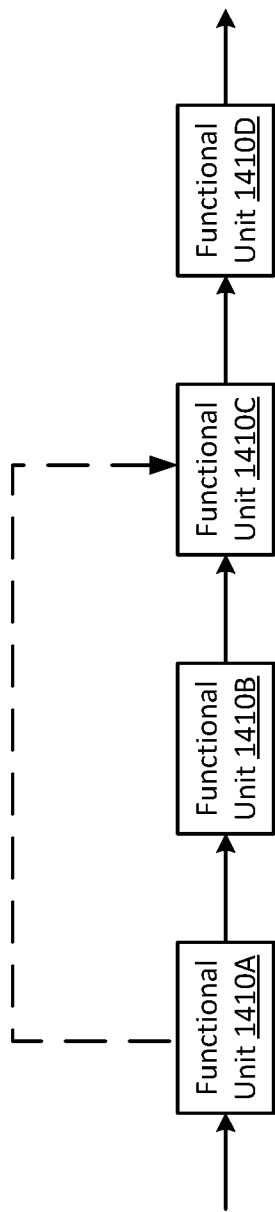
FIG. 14 is a high-level diagram of a sequence of functional units, in accordance with an example embodiment.

FIG. 14 is a high-level diagram of a sequence of functional units, in accordance with an example embodiment. Functional unit 1410 may be a discrete logical step that can accomplish a task. For example, functional unit 1410 may be a sequence of operations (e.g., as previously described in FIG. 6), a call to a third-party API, a preprogrammed function call, or the like. As shown in FIG. 14, two or more functional units, e.g., 1410A-D, may be executed in sequence to accomplish a complex task, such as a task that includes various sub-tasks. Data that is output from one functional unit, e.g., 1410A, may be subsequently used as input to another functional unit, e.g. 1410B. The order of execution of a sequence of functional units 1410 is not necessarily one-directional. For example, a single functional unit may be executed multiple times and operation mimicry system 100 can skip around between functional units, e.g., from functional unit 1410A to 1410C (as indicated by the dotted line).

Figure 15:
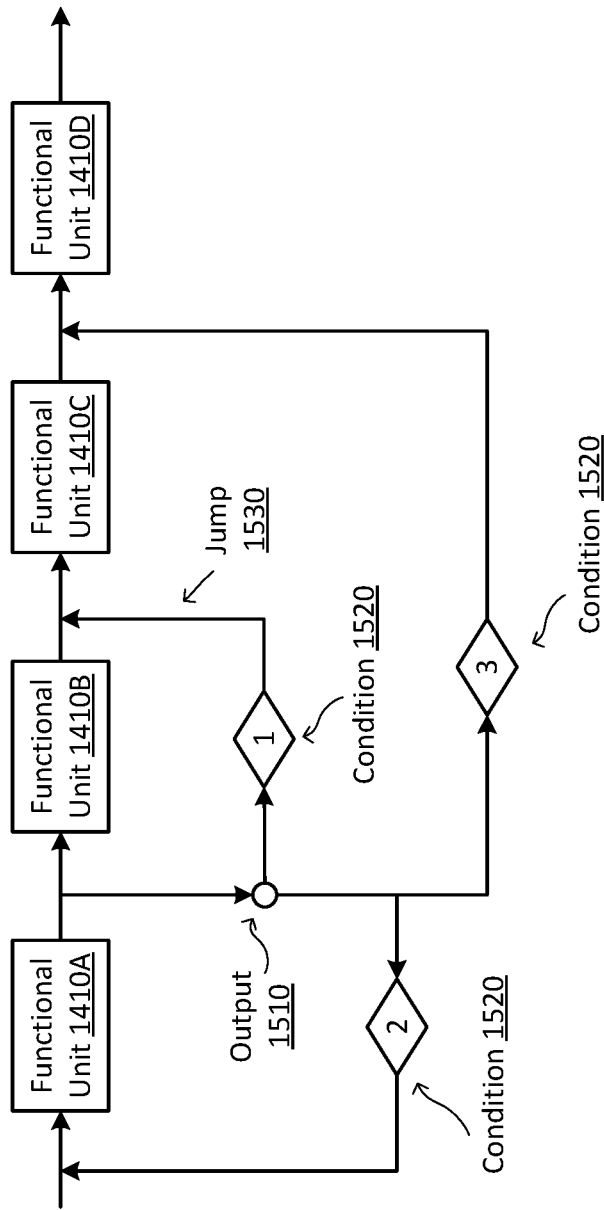
FIG. 15 is a high-level data flow diagram illustrating example control streams for executing functional units, in accordance with an example embodiment.

FIG. 15 is a high-level data flow diagram illustrating example control streams for executing functional units 1410, in accordance with an example embodiment. Execution of a functional unit, e.g., 1410A, may produce an output 1510. For example, output 1510 may include a value returned from an API call, a value returned from a function call, or a view-structure. In some example embodiments, operation mimicry system 100 may evaluate output 1510 using predetermined conditions 1520 to determine a next functional unit, e.g., 1410C, to be executed. In some example embodiments, multiple conditions 1520 may be evaluated in a predetermined order. For example, in FIG. 15, three conditions 1520 are labeled with numbers 1, 2, and 3, indicating an example order of evaluation. A jump 1530 may occur when a condition is met by the data in the output 1510 and prompts the execution of a functional unit 1410 that is not the next functional unit, e.g., 1410A to 1410C, in an otherwise default sequential set of functional units 1410.

In an example embodiment, conditions 1520 may analyze specific components of a view-structure (e.g., a textview or a button) and/or values present in the results of an API call or function call. For example, condition 1520 may determine whether or not a component of a view-structure in output 1510 includes certain component types. In another example, a condition 1520 may check whether a specific pattern is included in a view-structure component (e.g., if a string describing a time is displayed in an edit text component of the view-structure). A condition 1520 may similarly analyze output 1510 based on a data type or value contained in output 1510, for example determining whether a certain value is returned as output 1510 from an API call.

Figure 16:
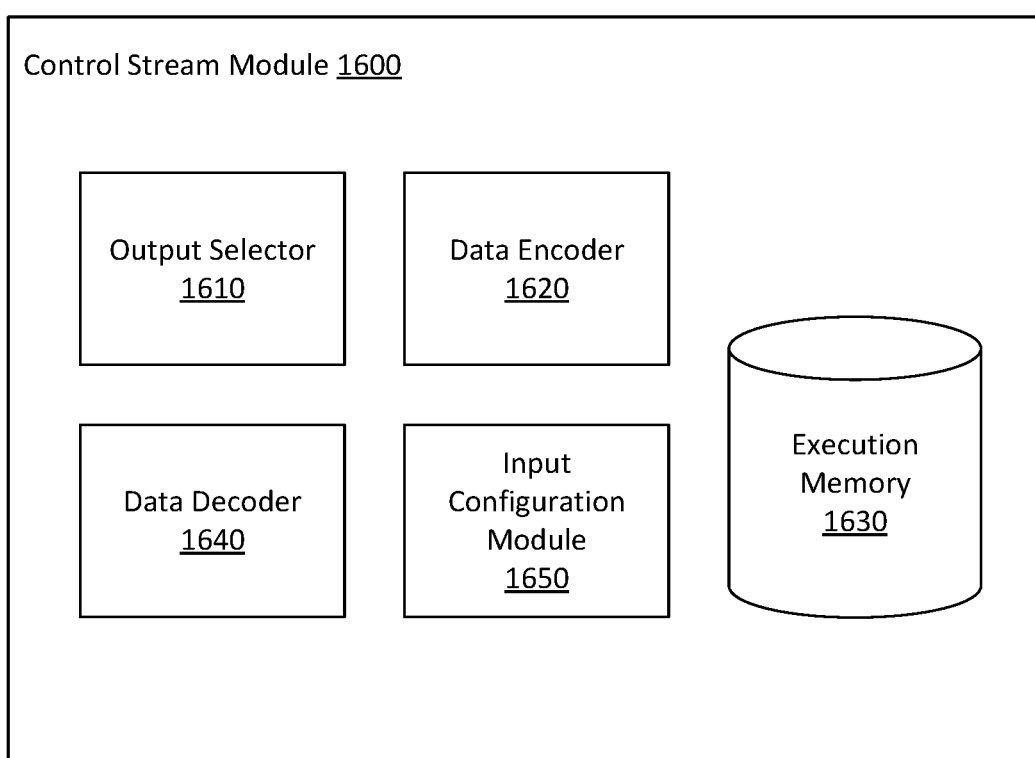
FIG. 16 is a high-level block diagram of a control stream module, in accordance with an example embodiment.

FIG. 16 is a high-level block diagram of a control stream module 1600, in accordance with an example embodiment. In some embodiments, a system architecture for operation mimicry system 100, as previously shown in FIG. 2, further comprises control stream module 1600. Control stream module 1600 may include output selector 1610, data encoder 1620, execution memory 1630, data decoder 1640, and input configuration module 1650. Control stream module 1600 may include additional, fewer, or different components from those shown in FIG. 16 and the functionality of the components as described herein may be distributed differently from the description herein. It is noted that the modules described may be described functionally and the functionality may be embodied as program code (or instructions, e.g., instructions 1824 described in FIG. 18) storable on a non-transitory computer readable storage medium and/or executable by at least one processor, e.g., processor 1802 described in FIG. 18.

The control stream module 1600 may be configured to manage transitions between functional units 1410, for example, as described in FIG. 15. In some embodiments, the control stream module 1600 also manages changes in input parameters that may occur when a functional unit 1410 is repeated multiple times within one sequence of functional unit executions. For example, if a repeated functional unit comprises a sequence of operations, the control stream module 1600 may change the text that is entered into a text field involved in one or more of the operations in the sequence. As another example, the control stream module 1600 may indicate that a parameter needs to be changed from a parameter that was used previously to make an API call.

Output selector 1610 may be configured to determine data in an output 1510 of a functional unit that one or more subsequently executing functional units 1410 may require to complete a task. In some embodiments, output selector 1610 parses information from elements of a view-structure output by a functional unit 1410. In embodiments in which functional unit 1410 comprises an API call, output selector 1610 may parse information from output 1510 that is in a data format returned by the API call.

Output selector 1610 may be configured in various ways. In one example embodiment, a developer defines data components to select from output 1510 (e.g., when preprogramming a series of functional units). In one example embodiment, output selector 1610 may be configured by a user using client device 105 (e.g., when recording a sequence of operations). In another example embodiment, operation mimicry system 100 may use machine learning techniques to determine relevant components of output 1510. For example, in response to a user request, control stream module 1600 may select a sequence of functional units 1410 to execute. For each functional unit 1410, control stream module 1600 can determine what input data will be required based on input parameters defined when the functional unit 1410 was created, and can use techniques such as natural language processing to select the appropriate output data from output 1510. For example, if a functional unit 1410 takes in a time and sets an alarm based on the input time, output selector 1610 may parse output of a previous functional unit 1410 in search of a reference to a time. In some example embodiments, a natural language processing model is used to predict steps at which control stream module 1600 may find the output data needed in certain functional units.

In some example embodiments, data encoder 1620 transforms data from output selector 1610 into a standard format. That is, although output 1510 may take various forms (e.g., returned data from API calls, view-structures, etc.), data encoder 1620 can encode the data in one or more predetermined formats. Standard, predetermined formats may include formats for storing time, location, job titles, and phone numbers. Standard data formats may aid storage and retrieval of data, for example. In one example embodiment, data encoder 1620 may process raw data obtained from output selector 1610 into data that is ready for a future functional unit 1410 to use. For example, if the output 1510 is a picture of a face, data encoder 1620 may convert output 1510 into data representing a face mesh. As another example, if output 1510 is a string representing a sentence, data encoder 1620 may generate data representative of an attitude expressed in the sentence (e.g., like or dislike).

Execution memory 1630 is a data store that may store data encoded by data encoder 1620. Execution memory may be local memory used only by client device 105, cloud memory that may be accessed remotely and/or shared with other users, or another type of memory. In one example embodiment, execution memory 1630 may additionally store data about conditions 1520 and jumps 1530. For example, control stream module 1600 may access information in execution memory 1630 to determine a default ordering for functional units 1410, sets of conditions 1520 to test against output values 1510, and/or appropriate jumps 1530 to make when conditions 1520 are met. Information stored in execution memory 1630 about functional unit execution ordering, conditions, and jumps may be preprogrammed by developers or may be generated during execution. For example, sets of conditions 1520 to test against output 1510 of a functional unit 1410 may change based on previously executed functional units.

Data decoder 1640 may be configured to retrieve data from execution memory 1630 and decode the data into a format that is appropriate for execution of a next functional unit 1410. For example, if a condition 1520 has determined that the next functional unit 1410 to execute is a sequence of operations, data decoder 1640 may select data for input into a text field of a view-structure from execution memory 1630, and may format the data in a string such as might be entered into a text field. As another example, if a condition 1520 determines that the next functional unit 1410 to execute is a particular function call, data decoder 1640 may retrieve relevant data from execution memory 1630 and format it so the data type matches requirements for parameters of the function call. The data decoder 1640 may use Named Entity Recognition (NER) techniques to identify information in execution memory 1630 to provide to a functional unit 1410. In other example embodiments, the data decoder 1640 may be programmed with instructions for accessing particular information for use as input to a functional unit 1410, or the data decoder may 1640 apply a machine model to determine which information is most likely to be needed as input to a functional unit 1410.

Input configuration module 1650 may be configured to enter formatted data from data decoder 1640 as input for a next executing functional unit. In an example embodiment, input configuration module 1650 can configure data for use as a parameter for a function, as a parameter for an API call, and as a part of a view-structure to be acted upon for a sequence of operations. In one example embodiment, input configuration module 1650 may configure data for input into a condition 1520, and for input into a functional unit 1410 after a jump 1530 to a new or repeated functional unit 1410.

Figure 17A:
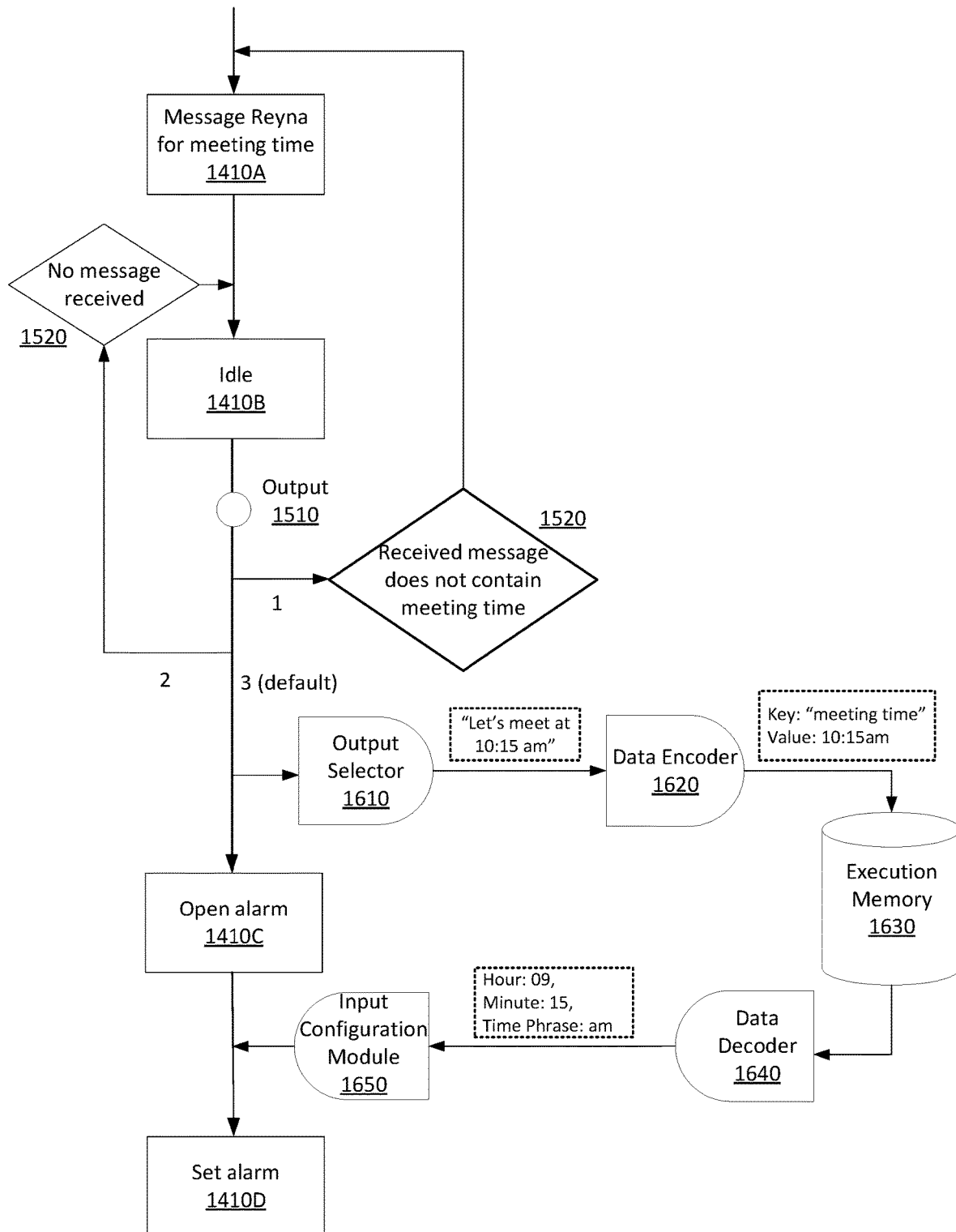
FIG. 17A is a data flow diagram illustrating a first example of using a control stream module, in accordance with an example embodiment.
Figure 17B:
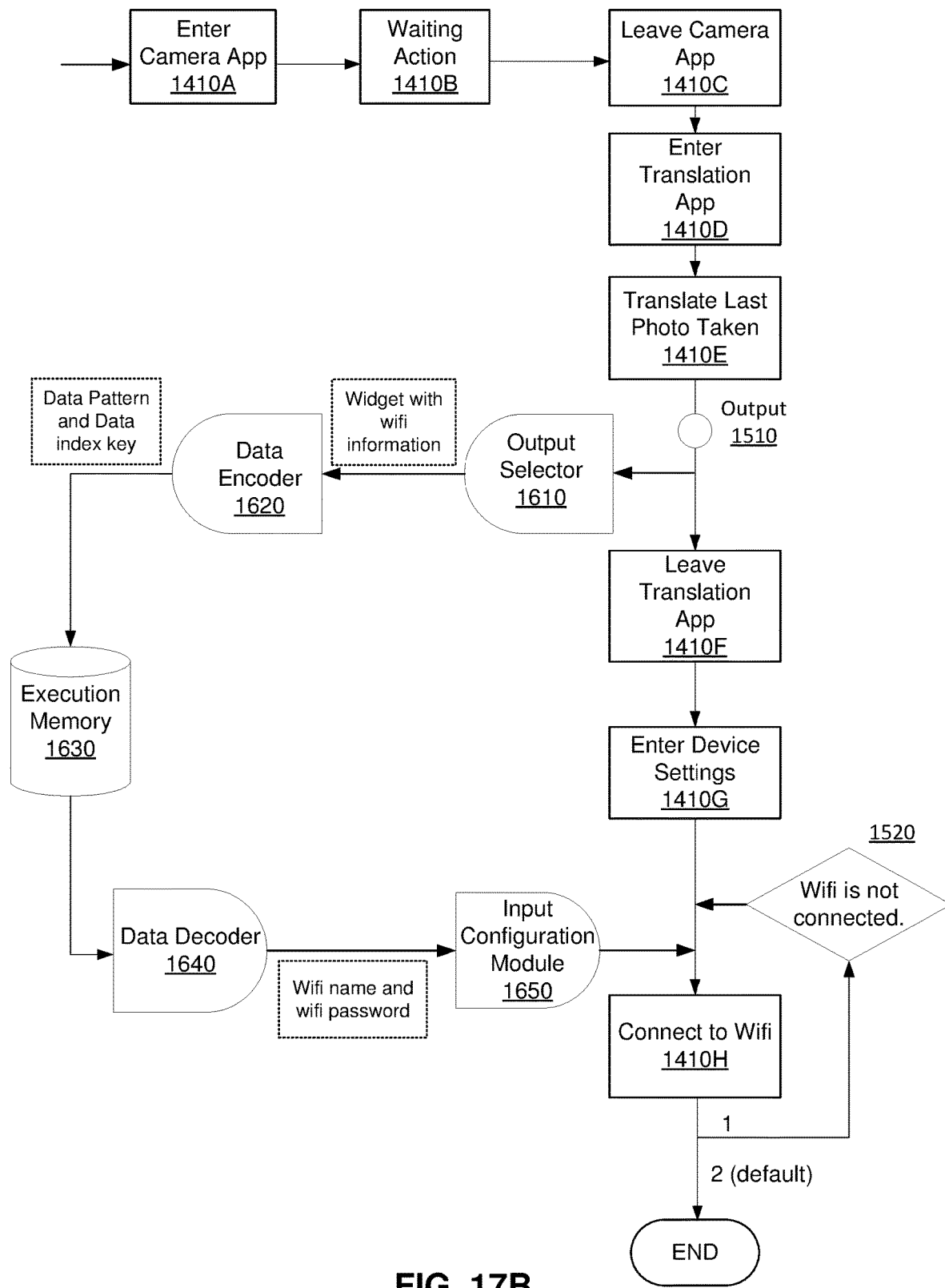
FIG. 17B is a data flow diagram illustrating a second example of using a control stream module, in accordance with an example embodiment.
Figure 17C:
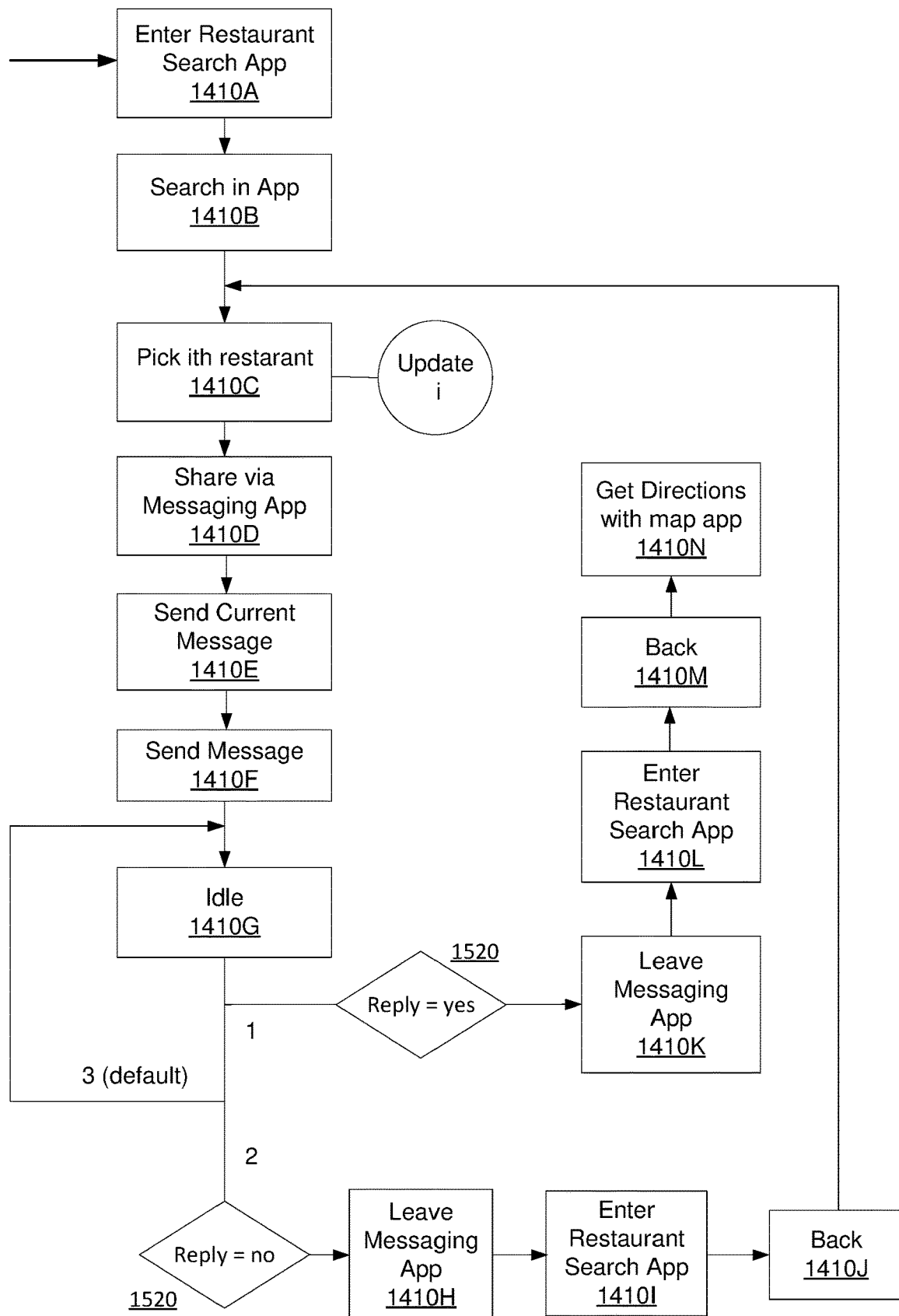
FIG. 17C is a data flow diagram illustrating a third example of using a control stream module, in accordance with an example embodiment.

FIGS. 17A-C are data flow diagrams illustrating examples of using the control stream module 1600, in accordance with an embodiment. The control streams depicted in FIG. 17A, FIG. 17B, and FIG. 17C incorporate uses of execution memory 1630, conditions 1520, and/or jumps 1530.

In the example scenario of FIG. 17A, a user plans to have a meeting the next day with a friend named Reyna, but the exact meeting time is not yet known and the user wants to go to bed. The user submits a request to operation mimicry system 100 to ask Reyna for the meeting time and to set an alarm for one hour before the meeting.

In the example, the user device executes functional units 1410A and 1410B to send Reyna a message asking about the meeting time and to wait for a response. In response to output 1510 from functional unit 1410B, control stream module 1600 evaluates conditions 1520 and jumps to a next functional unit 1410 accordingly. For example, a first condition 1520 checks whether output 1510 includes a message from Reyna that does not contain a meeting time, and returns to functional unit 1410A to message Reyna again. A second condition 1520 determines if no message has been received, and continues to wait for a message by repeating functional unit 1410B. When neither of the conditions 1520 are met (i.e., a message from Reyna containing a meeting time is received), output selector 1610 selects relevant data from output 1510. For example, a relevant portion of Reyna's message may be a sentence containing a time such as "Let's meet at 10:15 am". Data encoder 1620 encodes the relevant output data and stores it in a standard format in execution memory 1630. For example, in FIG. 17, the data encoder stores a key "meeting time" with a value "10:15 am" in execution memory 1630.

Meanwhile, control stream module 1600 executes functional units that do not need data obtained from output 1510 as input. In the example of FIG. 17, functional unit 1410C, which includes opening an alarm application, is executed. When a next functional unit 1410 requires data output from a previous functional unit as input, control stream module 1600 may access the data stored in execution memory 1630. In the example, data decoder 1640 retrieves a key "meeting time" and a value "10:15 am" from execution memory 1630 and formats the data appropriately for functional unit 1410D to set an alarm. Since, in the example, the user requested that an alarm be set for one hour before the meeting time, data decoder 1640 formats the data by subtracting one hour from the meeting time. Input configuration module 1650 enters the decoded data into an input configuration that is appropriate for the next functional unit (e.g., a data type accepted as input to the functional unit). Input configuration module 1650 prepares the data for input into functional unit 1410D, for example by inputting the data into text fields of an alarm application. Finally, functional unit 1410D executes, setting an alarm at the appropriate time.

FIG. 17B illustrates an example of using control stream module 1600 to automatically connect client device 105 to wifi using a photo of the wifi name and password stored on client device 105.

In the example, the client device 105 executes a series of functional units 1410 A-E to enter a camera application, access a photo stored on the application, leave the camera application, enter an application for translation or optical character recognition (OCR), and to determine a widget containing WiFi password included in the accessed image. The determined widget is included in output 1510 of the series of functional units 1410. The output 1510 information is accessed by output selector 1610 and analyzed by data encoder 120. In the example, data encoder 1620 formats the WiFi widget information into a key-value format and the data is stored in execution memory 1630.

In the meantime, control stream module 1600 directs the system to continue executing a next sequence of functional units 1410 F-G that include leaving the translation application and entering a settings application from which the WiFi connection for client device 105 can be controlled.

Control stream module 1600 accesses execution memory 1630 to determine a WiFi password to use when executing a functional unit 1410H for connecting to the WiFi. Specifically, the data is retrieved from execution memory 1630 by data decoder 1640 which determines the name and password of the WiFi network from the retrieved data. Input configuration module 1650 formats the WiFi name and password for use in executing functional unit 1410 to connect to the WiFi network. For example, functional unit 1410 may be an operation that involves entering the WiFi name and password into fields of a view-structure and then clicking on a "join" button to connect to the network. In the example of FIG. 17B, control stream module 1600 determines whether the task is complete by checking condition 1520 to determine whether the WiFi is connected. If the WiFi is not connected, control stream module 1600 continues to try to access the WiFi network by accessing password and network information at execution memory 1630 and using it to execute functional unit 1410.

FIG. 17C illustrates an example of using control stream module 1600 to automatically message a friend to choose a restaurant at which to meet. In particular, the example of FIG. 17C demonstrates jumping and looping functionalities of control stream module 1600.

In response to a request from a client, control stream module 1600 generates a sequence of functional units 1410 A-G that include the functionalities of opening a restaurant search application, searching for a value related to a request in the application, selecting a restaurant from a results list, sharing the selected restaurant with a friend via a messaging application, and waiting for a reply from the friend. The control stream module 1600 determines a next set of functional units for execution based on a set of conditions 1520. In the first condition 1520, if a reply is received from the friend saying "yes" then control stream module 1600 generates and manages functional units 1410 K-N which include leaving the messaging application, entering the restaurant search application to find the restaurant address, and requesting directions to the website with a mapping application. In the second condition 1520, if a reply is received from the friend saying "no" then control stream module 1600 generates functional units 1410 H-J for leaving the messaging application and reentering the restaurant search application, and further plans the execution of functional units 1410 C-F again, wherein a new potential restaurant is selected and sent to the friend. Notably, control stream module 1600 keeps track of an update value for identifying a next restaurant in a restaurant search application results list. Such an update value may be stored in execution memory 1630 and updated in situations when a functional unit 1410 is repeated in a sequence of functional units 1410.

Contextual Action

In one example embodiment, operation mimicry system 100 may suggest actions for a user to request based on contextual information and the user's history of performing certain operations on client device 105. Contextual information may include information about content and view-structures that are rendered to a screen of a client device 105 and information about operations and other functional units that execute within a system environment of operation mimicry system 100. Operation mimicry system 100 parses information from data that appears on a screen of client device 105 (e.g., data within a view-structure), data from notifications received at client device 105, and the like. Data appearing on a screen of client device 105 may be parsed based on its relation to an application a user is currently using, a location of text on the screen, a font size, etc. In some system configurations, such as the system environment described in FIG. 1B, operation mimicry system 100 additionally or alternately parses view-structure and content information from executing data (e.g., on operation execution system 140), rather than only parsing data that is displayed at client device 105.

The user may subsequently be presented with options for actions that may be performed. In an example embodiment, operation mimicry system 100 may present the user with user interface elements (e.g., buttons) to use to select among the suggested actions and submit a request to the system to perform one or more of the actions. In one example embodiment, operation mimicry system 100 performs the one or more actions requested by the user using a control stream of functional units 1410, as described above. The actions requested by the user may be executed as a background process so that the user may continue interacting with applications on client device 105 while the actions are being completed.

Figure 18B:
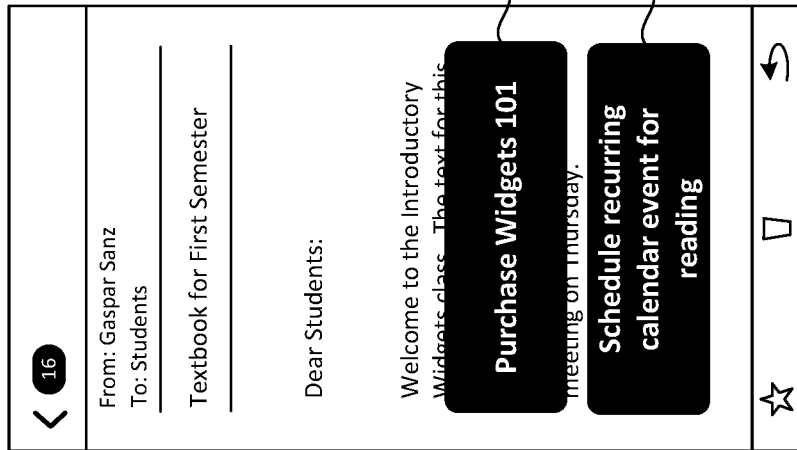
FIG. 18B illustrates an example interface displaying suggested requests for a user to select based on the contents of an interface, in accordance with an example embodiment.
Figure 18A:
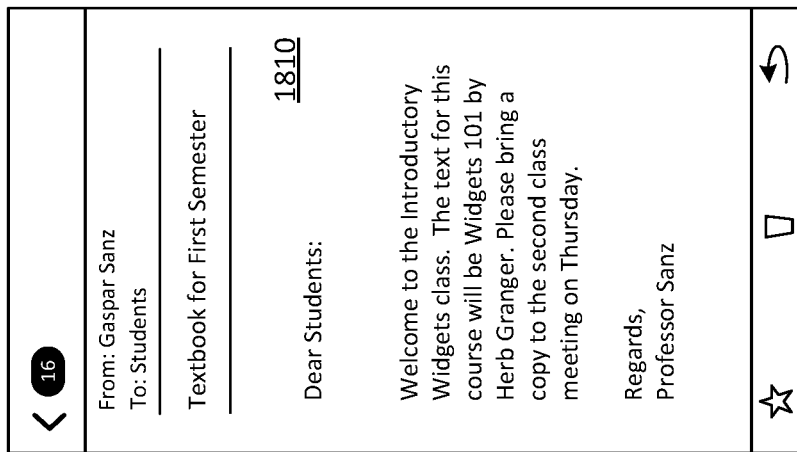
FIG. 18A illustrates an example interface displaying an email on a client device, in accordance with an example embodiment.

FIG. 18A is an illustration of an example interface displaying an email on a client device 105. In the example, a user views an email 1810 from a professor that says: "The text for this course will be Widgets 101."

FIG. 18B is an illustration of an example interface displaying suggested requests for a user to select based on the contents of the interface. Operation mimicry system 100 may present the user with suggestions 1820 to "Purchase Widgets 101" and to "Schedule recurring calendar event for reading." According to one example embodiment, the user may select one or more of the options, and operation mimicry system will perform the actions in one or more background processes while the user continues using other applications on client device 105 manually. In some example embodiments, a user can select one or more of the suggested options using voice input, thoughts collected via EEG, and/or by manually interacting with a software or hardware component on client device 105 (e.g., a button).

In one example embodiment, operation mimicry system 105 provides suggestions 1820 based on actions the user is likely to request. A likelihood of a user requesting an action may be determined using a machine learning model that takes in user operation history on client device 105 and contextual content as input and outputs a likelihood score. In some example embodiments, the likelihood score may be compared to a predetermined threshold value to determine whether the suggestion 1820 will be presented to the user.

In one example embodiment, operation mimicry system 100 generates one or more sequences of operations and/or sequences of functional units to suggest to a user based on a current context of a screen of client device 105. Operation mimicry system 100 parses content from a screen of client device 105, for example, by collecting data included in a view-structure of the current view on client device 105. For example, in FIG. 18A, operation mimicry system 100 receives information about the contents of the email by analyzing the content in the view-structure of the email interface.

In one embodiment, a machine learning model may be used to interpret a scenario in which client device 105 is being used. Based on a determined scenario, operation mimicry system 100 can make suggestions for requests that the user may want to submit. For example, if a user of client device 105 is communicating with another person via a messaging app, and the user receives a message suggesting an action to take, operation mimicry system 100 may suggest related actions and/or sequences of operations to the user. In such a scenario, operation mimicry system 100 may input message content and information about a relationship between the user and the person with whom the user is communicating (e.g., as specified previously by the user, or as inferred by the system) into a machine learning model which determines requests that are most likely to correspond to messages between the users.

Operation mimicry system 100 may use a machine learning model to determine actions a user is likely to want to request. Inputs to the model may include content extracted from a view-structure on a current screen of client device 105, personal preferences of the user (e.g., as previously specified by the user or as inferred by operation mimicry system 100 based on previous user actions), and a current task a user is performing on client device 105. The model compares the input values with required input parameters of sequences of operations stored in operation store 210. In one example embodiment, the model may determine likelihood scores for one or more of the sequences of operations and/or sequences of functional units. A likelihood score may represent the likelihood that a user will select an action if it is suggested. In one embodiment, an action associated with a sequence of operations is suggested to the user if it receives a likelihood score that exceeds a predetermined threshold value.

The operation mimicry system 100 may present suggested sequences of operations to the user. The user may select a sequence, for example via touch, text, or voice input. The operation mimicry system 100 subsequently sends the selected sequence of operations to a client device 105 for execution.

In some example cases, operation mimicry system 100 may suggest actions to a user based on a vocal input received at client device 105. A machine model may accept the voice input and content included on a current screen of client device 105 as input and suggest actions for the user to select, as described above. In one example embodiment, a vocal input may be interpreted by operation mimicry system 100 as a user request. Operation mimicry system 100 may select a sequence of operations associated with the user request, and may further collect input data for the sequence of operations from the current screen of client device 105.

Smart Indexing

Disclosed by way of example embodiments is a system and method for collecting knowledge about relationships between users and concepts. The system may use stored relationship information to improve or personalize responses to user queries submitted to the system. In some example embodiments, the system (as referred to in the "Smart Indexing" section of this disclosure) is a smart-indexing module and may be included as a module of operation mimicry system 100.

Figure 19:
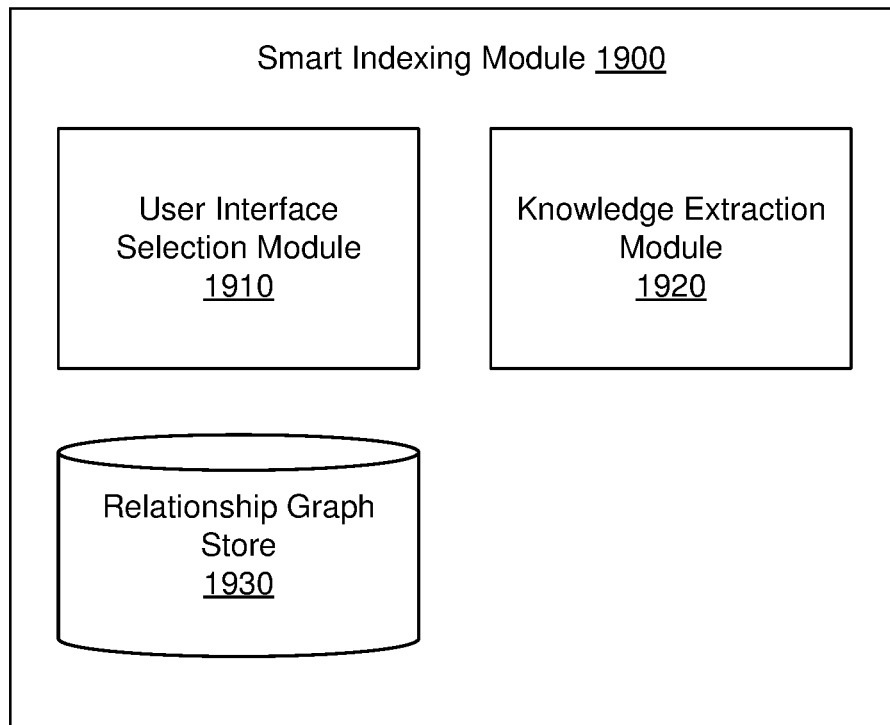
FIG. 19 is a high-level block diagram of a smart-indexing module, in accordance with an example embodiment.
Figure 23:
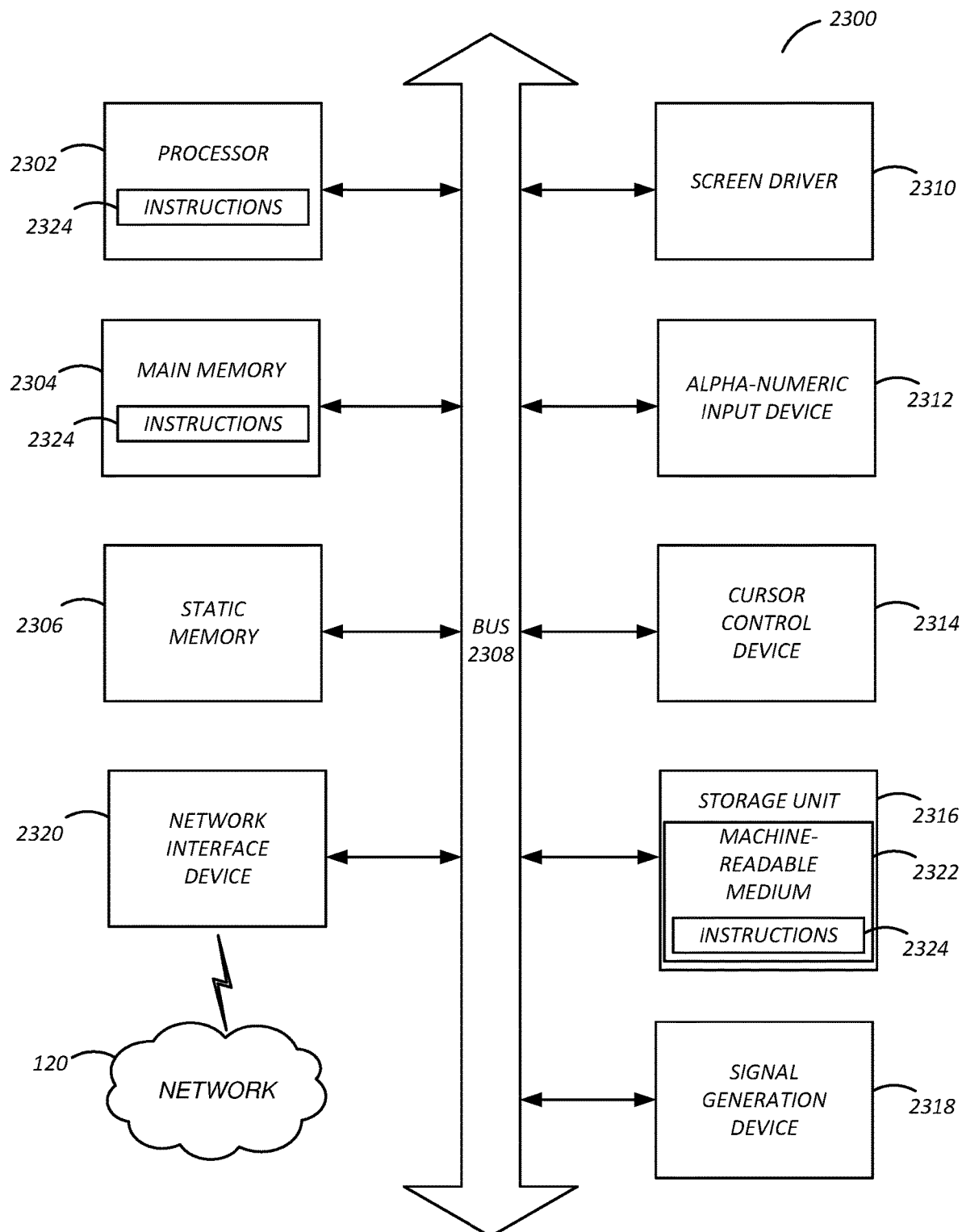
FIG. 23 is a block diagram illustrating components of an example machine able to reach instructions from a machine-readable medium and execute them in one or more processors, in accordance with an example embodiment.

FIG. 19 is a high-level block diagram of a smart-indexing module 1900, in accordance with an example embodiment. In some embodiments, a system architecture for operation mimicry system 100, as previously shown in FIG. 2, further comprises smart-indexing module 1900. In some example embodiments, a smart-indexing module may be on a system separate from operation mimicry system 100. Smart indexing module 1900 may include user interface element selection module 1910, knowledge extraction module 1920, and relationship graph store 1930. Smart indexing module 1900 may include additional, fewer, or different components from those shown in FIG. 19 and the functionality of the components as described herein may be distributed differently from the description herein. It is noted that the modules described may be described functionally and the functionality may be embodied as program code (or instructions, e.g., instructions 2324 described later in FIG. 23) storable on a non-transitory computer-readable storage medium and/or executable by at least one processor, e.g., processor 2302 as shown in FIG. 23.

Smart indexing module 1900 may be configured to receive user comments in relation to user interface elements, and to store explicit and inferred information related to the comments in a relationship graph. In some example embodiments, smart indexing module 1900 also provides information from a relationship graph to applications and software to use to personalize information that is provided to a user or to source general knowledge about a concept from many users.

User interface selection module 1910 receives information about user interface elements that have been selected by a user. For example, user interface selection module 1910 may receive information about a user interaction with a user interface element on a display of a client device 105, such as via a side-button click, a touch, a long touch, a double-click, etc. User interface selection module 1910 may additionally receive and/or record a comment provided by the interacting user, a comment comprising a description of a concept related to the user interface element with which the user is interacting. In some example embodiments, comments may be provided via text input, voice input, or electroencephalogram (EEG). In some cases, user interface selection module 1910 may receive identifying information about an interface element via a user comment, rather than via a user interaction with an interface element. That is, a user might describe a user interface element and then provide an accompanying comment.

Knowledge extraction module 1920 may use natural language processing techniques to determine relationships between concepts, users, groups, and entities based on the information collected by user interface selection module 1910. Inputs to the natural language processing may include concepts or entities that selected user interface elements represent, as well as the associated user-provided commentary. Knowledge extraction module 1920 outputs data about the concepts and/or entities associated with a selected user interface element, data about a user or group of users who expressed the opinion in the user comment, and data about how the user or group is related to the identified concept, object, or entity. In some example embodiments, knowledge extraction module 1920 also uses natural language processing techniques and machine learning techniques to determine a type of relationship. That is, a user may make a comment that includes varying levels of emotional attachment to an object, or that expresses subjective or relative relationships of a user to a concept or entity represented by a selected user interface element.

Knowledge extraction module 1920 may store the information it generates in one or more relationship graphs. The relationship graphs are stored in relationship graph store 1930. Although a graph data structure is used herein to describe how concepts, users, and relationships are stored in relation to each other by smart indexing module 1900, a person of skill in the art will recognize many data structures that may also be used to store the same information. A relationship graph may describe users' relationships with every possible concept represented by a user interface element within a software application. When data is added to a relationship graph, an edge may be formed between a node representing a concept associated with a user interface element and a node representing a user or group of users. If a relationship graph does not have a node representing a concept associated with a user interface element or a node representing a particular user or group, new nodes may be added to the relationship graph. An edge in a relationship graph represents a relationship between two entities that are represented by the nodes the edge connects. In one example embodiment, data received from all users may be stored in one relationship graph. Such a combination of user inputs about relationships may be used to build a general knowledge about concepts stored in the graph. In some example embodiments, individual relationship graphs may be created for each user, each graph thus representing individual user preferences and opinions.

FIG. 20A illustrates an example of a user-provided comment that relates to a selected user interface element, in accordance with an example embodiment. When interacting with an application on a client device 105 (e.g., smartphone, tablet, computer, etc.), a user may select a user interface element 2010 and may submit a comment 2020 related to the user interface element 2010 to smart indexing module 1900. A user interface element 2010 may be any component of a user interface that is presented to the user. Note that user interface elements 2010, as referred to herein, are not limited to elements of an application that are included in the application for the purpose of accepting and/or responding to user interactions. As an illustrative and non-limiting example, user interface elements 2010 such as images and text may be considered user interface elements 2010 as well as elements such as buttons, radio dials, text entry fields, and the like.

In some example embodiments, a user selects a user interface element 2010 by performing a special user interaction with the user interface element 2010. For example, on a touch screen, such an interaction may be a deep touch, a touch and hold, a double tap, etc. In some embodiments, such an interaction may include a user interaction with a hardware component of the client device 105 (e.g., by clicking on a hardware switch (e.g., button or toggle switch) or touching a touch-sensitive component of a display screen associated with the user device). In still another example embodiment, a user interface element 2010 is implied by a user comment 2020. For example, a user comment 2020 that "I love the garlic noodles at the third place" indicates that the user interface element 2010 is a third restaurant in a list shown on a screen of client device 105. In the example of FIG. 20A, a user has selected a portion of a list in a restaurant search application that describes a restaurant called "Great Wok."

Having selected a user interface element 2010, the user may comment on a concept represented by the user interface element 2010. A comment 2020 about a selected user interface element 2010 may be input into smart indexing module 1900 using natural language input, such as typed text, voice input recorded with a microphone, and user thoughts collected with electroencephalography (EEG) or other brain activity monitoring devices. A comment 2020 submitted in relation to a selected user interface element 2010 may be a description of the user interface element 2010, a description of a concept or entity represented by or related to the user interface element 2010, or the like. For example, a user might select a user interface element 2010 that includes the name of a restaurant, e.g., "Great Wok", in a restaurant search application. The user may subsequently comment 2020 on the selected user interface element, for example, by inputting a phrase such as "I love the garlic noodles at this place."

Figure 20B:
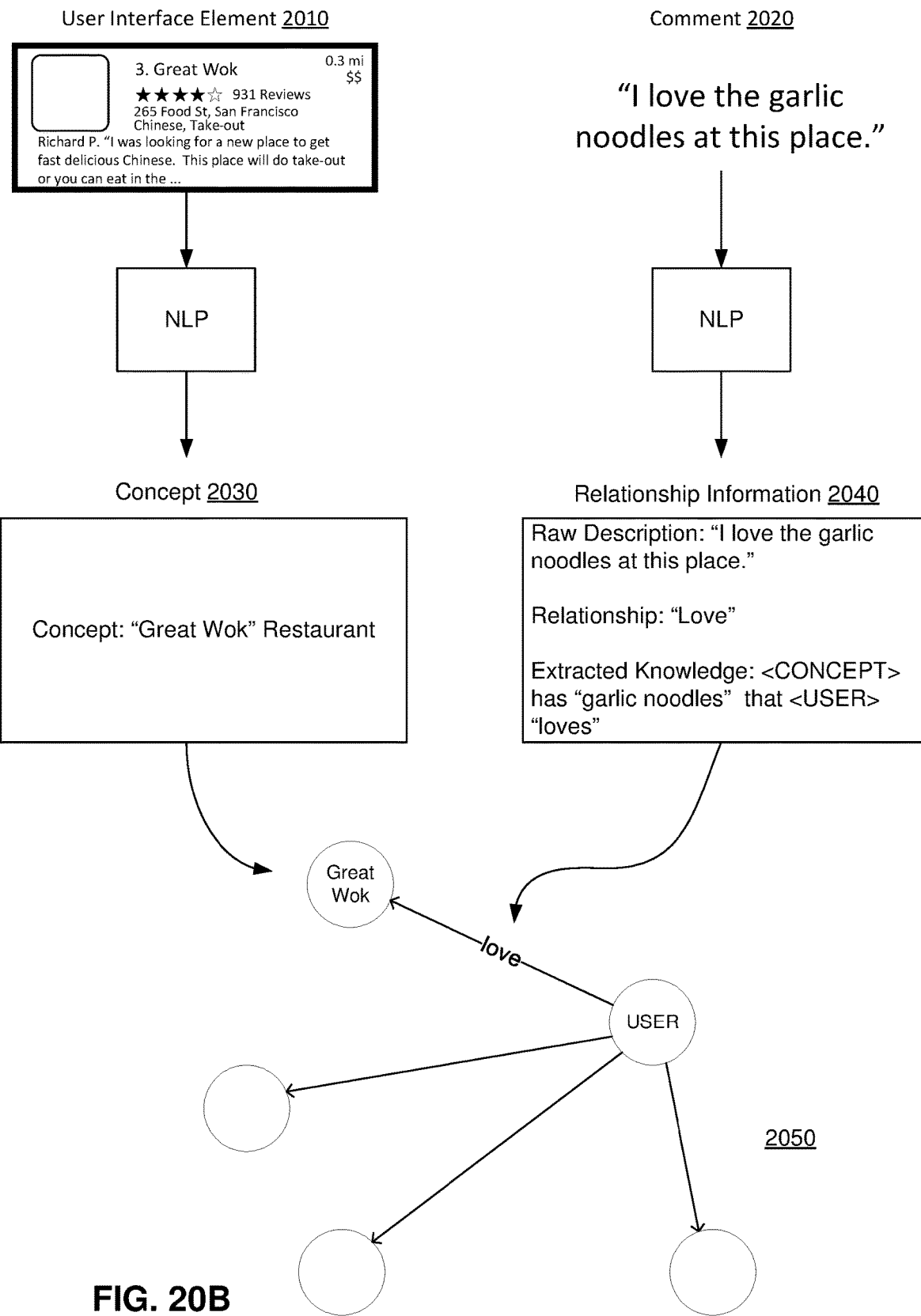
FIG. 20B illustrates a process of incorporating information about a user interface element and an associated comment into a relationship graph, in accordance with an example embodiment.

FIG. 20B is an illustration of a process of incorporating information about a user interface element 2010 and an associated comment 2020 into a relationship graph, in accordance with an example embodiment. Smart indexing module 1900 may use natural language processing techniques to determine a concept or entity that is represented by the selected user interface element 2010. Smart indexing module 1900 may further use natural language processing techniques to determine key information about the accompanying comment 2020. In the example of FIG. 20B, natural language processing is applied to the content of the selected user interface element 2010 to determine that a concept 2030 associated with the user interface element 2010 is a restaurant called "Great Wok." In the example, natural language processing is also used to determine relationship information 2040 in view of the phrases used in the comment 2020. The relationship information 2040 may include information about the subject and object of the comment 2020 and descriptive information that links the subject and object together. For example, in FIG. 20B, the subject is determined to be the user, the relationship is "love" (specifically love of the garlic noodles), and the object is the concept represented by the user interface element, i.e., "Great Wok."

Smart indexing module 1900 stores relationship information 2040 in relation to the determined subject of the comment 2020 and in relation to the entity or concept 2030 about which the comment 2020 was submitted. In an example embodiment, smart indexing module 1900 stores the information in the form of a relationship graph 2050, in which nodes represent objects, entities, concepts 2030, and users, and in which edges represent relationship information 2040 describing a relationship between concepts and users represented by the two nodes the edge connects. For illustrative purposes, FIG. 20B shows a portion of a relationship graph 2050 in which a user is related to several different concepts 2030, shown as circular nodes.

The nodes of such a relationship graph 2050 do not necessarily represent the particular user interface elements 2010 themselves but rather correspond to concepts 2030, entities, objects, or people represented by user interface elements 2010. Natural language processing is used to associate a user interface element 2010 with a particular concept 2030 that may be represented by a node in a relationship graph 2050. Different user interface elements may be associated with the same concept 2030. For example a "John Doe" shown in one messaging application may be the same person as "John Doe" in a different messaging application, and comments 2020 submitted in relation to a user interface element 2010 that represents "John Doe" in either of the applications would be connected to one "John Doe" node in a relationship graph 2050.

Edges of a relationship graph 2050 represent relationships between concepts 2030 that are represented by nodes. Edges may include details about relationship information 2040, additional metadata about a comment 2020, or may simply indicate a connection between two concepts 2030. In one embodiment, each comment 2020 provided to smart indexing module 1900 becomes an edge in relationship graph 2050.

Some comments 2020 may include a chain of reasoning or may express multiple relationships. In such cases, knowledge extraction module 1920 may include some or all of the determined relationships as edges in a relationship graph 2050. For example, if a user submits the comment "I like it because it is spicy," knowledge extraction module 1920 may determine that the comment 2020 includes a "liking" relationship between the commenting user and the concept 2030, and may also determine that the comment 2020 includes a general attribute, "spicy," to apply to the concept 2030.

If information from a comment 2020 is determined by knowledge extraction module 1920 to contain any objective adjectives or terms that describe a user's particular reasoning for liking or disliking something, then the information may be used to determine whether the comment 2020 pertains to the user's personal experience, or whether the comment 2020 pertains to general knowledge that is applicable to all users. In some embodiments, general knowledge may be represented as an attribute of the node that represents the associated concept 2030, or as an edge leading from the node to itself. In one embodiment, general information is included in an edge from the commenting user to the node that represents the associated concept 2030, but additional metadata about the generalizability of the relationship information 2040 may be included as a part of the edge.

As an illustrative example of storing generalizable information, a user may select a user interface element 2010 that represents the restaurant "Great Wok" and the user may provide the accompanying comment 2020 "I love the garlic noodles at this place." In addition to storing relationship information 2040 about the user's relationship with the restaurant in a relationship graph 2050, smart indexing module 1900 may use semantic parsing to generalize the comment 2020 into information about the restaurant. That is, the fact that a user loves the Chinese pepper at the Great Wok restaurant may be associated with a node in a relationship graph 2050 that represents Great Wok. In some embodiments, this information may be accessible to any user who accesses information related to the Great Wok restaurant or who sends a request that relates to the Great Wok restaurant to operation mimicry system 100.

In some embodiments, a determination of relationship information 2040 includes a determination of a level of objectivity of the associated comment 2020. As referenced above, the objectivity of a comment 2020 may affect where and how the relationship information 2040 associated with the comment 2020 is stored in a relationship graph 2050. Smart indexing module 1900 uses natural language processing to determine whether a comment 2020 is more subjective or objective, and to determine the subject of the comment 2020. For example, smart indexing module 1900 may determine that a user is expressing a personal opinion about the concept 2030 represented by the selected user interface element 2010, that the user is expressing an opinion on behalf of another person, or that the user is expressing a general consensus or fact about the concept 2030 that is accepted by all people or by a group of people.

Smart indexing module 1900 analyzes several aspects of a comment 2020 to determine its objectivity. First, a natural language processing model may be trained to account for whether the commenting user includes himself in a comment 2020. For example, the commenting user appears in the phrase "I like it" but not in the phrase "It is spicy," suggesting that the first phrase is more subjective. Second, smart indexing module 1900 may use named entity recognition (NER) techniques to determine information about a concept 2030 expressed via adjectives and clauses included in a comment 2020. Knowledge extraction module 1920 may use results of such an NER analysis to determine additional information about the extent of the objectivity of such a comment. Objectivity may be represented in various ways as a part of relationship information 2040, including as an objectivity score that assigns a likelihood that a comment is objective, or as a binary value indicating that a comment applies either generally or only to the subject of the comment 2020.

In some embodiments, smart indexing module 1900 stores a separate relationship graph 2050 for each user, rather than storing all relationship information 2040 together in one centralized graph. In such cases, knowledge extraction module 1920 may gain additional information about the objectivity of an idea expressed in a comment 2020 by merging multiple relationship graphs 2050. The knowledge extraction module 1920 can then count a number of times certain attributes appear in comments 2020 from different users about the same concept 2030. Then, a metric for measuring objectivity may be a number of users who express similar opinions about a concept (i.e., a number of users who have the same relationship with a concept 2030 in their respective relationship graphs 2050).

Figure 21:
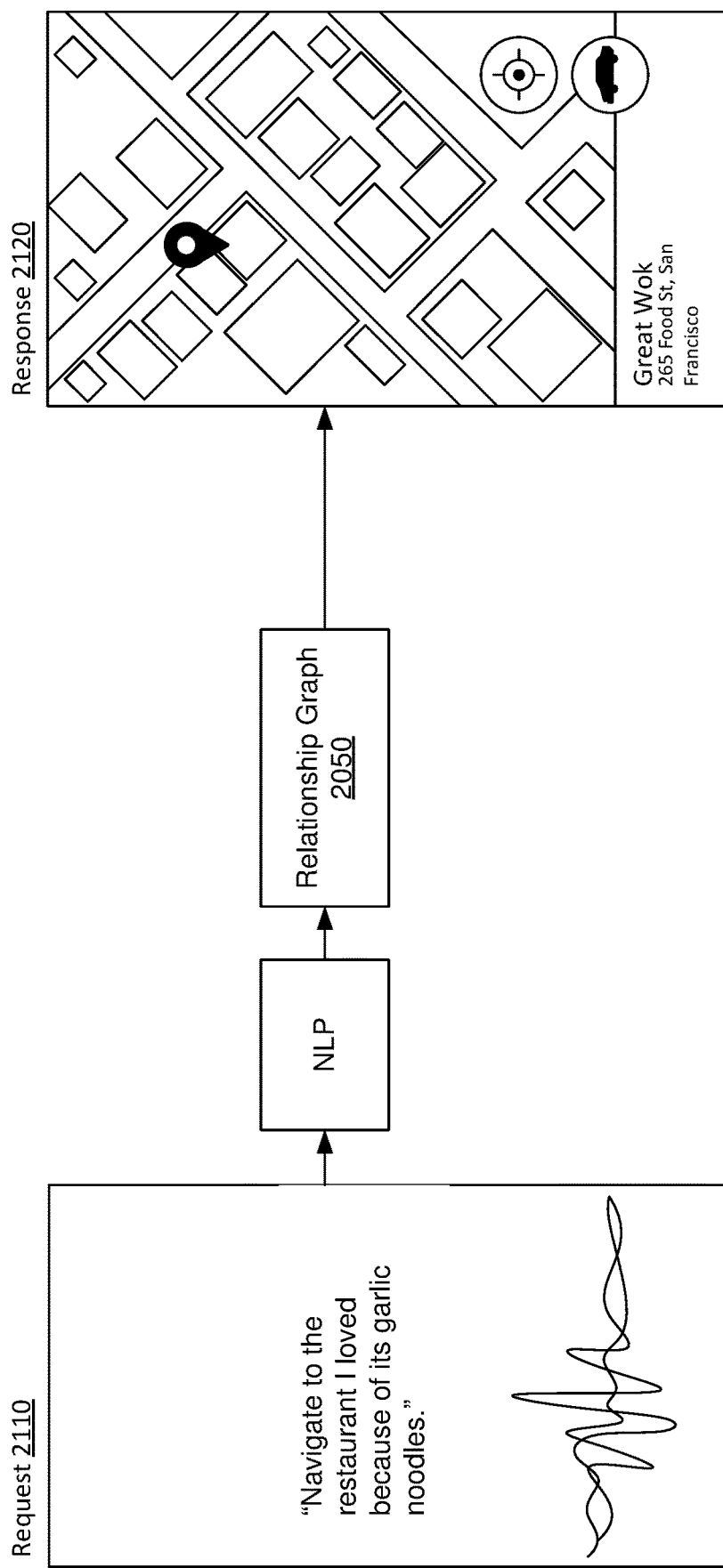
FIG. 21 illustrates an example of a personalized interaction that involves information from a relationship graph 2050, in accordance with an example embodiment.

FIG. 21 illustrates an example of a personalized interaction that involves information from a relationship graph 2050, in accordance with an example embodiment. Smart indexing module 1900 can use personal and generalized information to customize and improve user interactions with applications on a client device 105. When a user submits a query or interacts with an application on a user device, information from relationship graphs 2050 can be accessed to determine information about the user's preferences and relationships with every concept 2030 represented in the relationship graph 2050. For example, a user may send a request 2110 to operation mimicry system 100 to "Navigate to the restaurant I loved because of its garlic noodles." Using processes described previously, operation mimicry system 100 may parse the request to determine a querying domain (e.g., "restaurant"). Operation mimicry system may then search within a relationship graph 2050 associated with the requesting user to find nodes associated with restaurants, and in particular with restaurants that are associated with user comments about "garlic noodles." Operation mimicry system 100 may then provide an appropriate response 2120 to the request 2110. For example, in FIG. 21, operation mimicry system 100 is shown responding to a request 2110 with a mapping program that can navigate the user to Great Wok.

In one embodiment, operation mimicry system 100 determines whether a concept 2030 represented in a node of a relationship graph 2050 is relevant to a query domain concept by calculating a distance between nodes that are associated with each in a relationship graph 2050. In another embodiment, operation mimicry system may try to match concepts and attributes that are submitted in a request with concepts and attributes that are represented by nodes and edges of a relationship graph 2050. For example, the request "Find me a place that has good garlic noodles" includes a similar concept 2030 (place) and attribute (good garlic noodles) as are indicated by the "Great Wok" node in a relationship graph 2050, and it's associated edge which describes it's good Chinese pepper.

Figure 22:
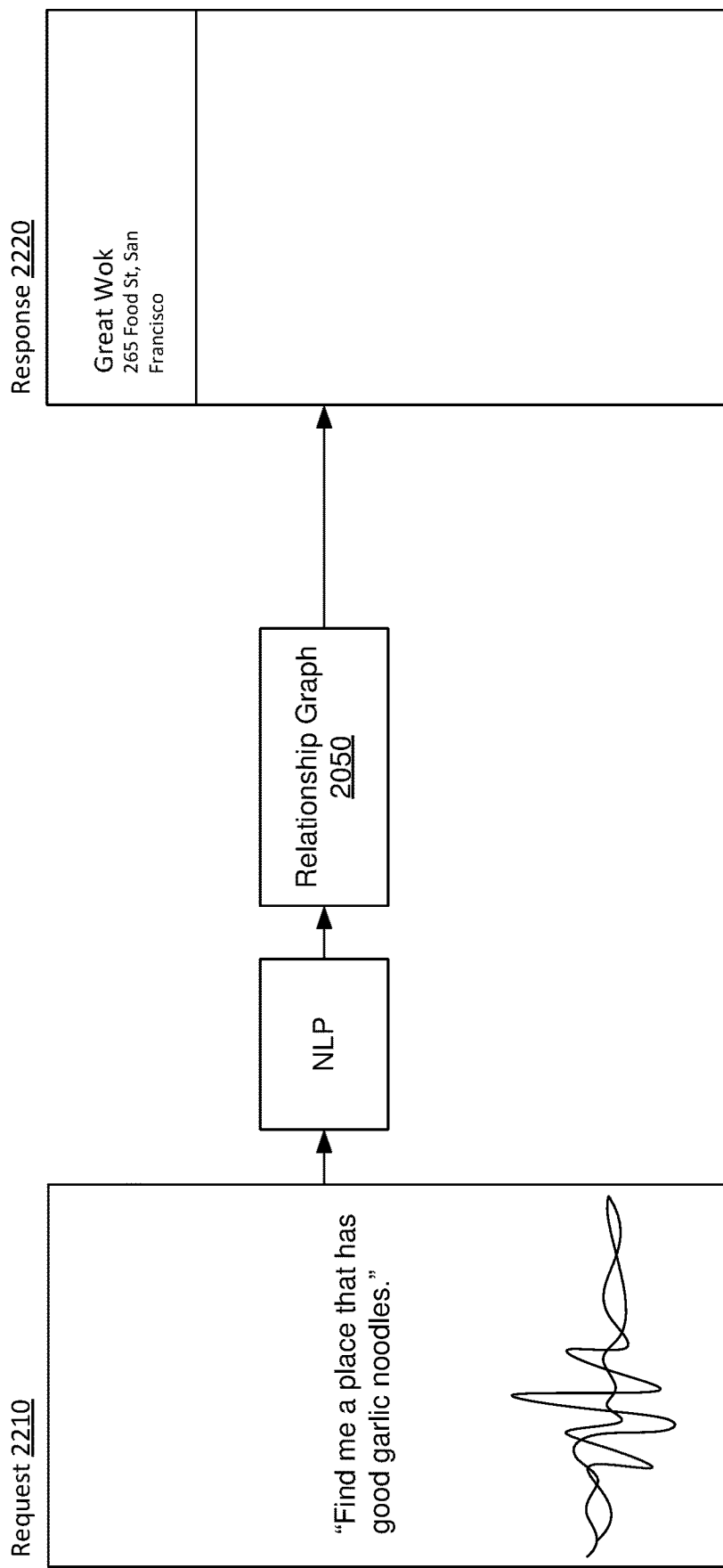
FIG. 22 illustrates an example of a generalized interaction that involves information from a relationship graph, in accordance with an embodiment.

FIG. 22 illustrates an example of a generalized interaction that involves information from a relationship graph 2050, in accordance with an embodiment. A user submits a request 2210 to operation mimicry system 100 to "Find me a place that has good garlic noodles." As in the example of FIG. 21, operation mimicry system 100 uses natural language processing to determine a domain of the query. In the example of FIG. 22, operation mimicry system searches a general relationship graph 2050 to find nodes and edges that refer to "garlic noodles." Operation mimicry system 100 finds the node for "Great Wok" and accompanying information about how it is a restaurant with good garlic noodles. In the example of FIG. 22, operation mimicry system 100 provides a response 2220 that lists Great Wok as a potential restaurant where the requesting user can find good garlic noodles.

In other example embodiments, operation mimicry system 100 may use data stored in relationship graphs 2050 to personalize user interactions with software applications. For example, user specific relationships and general knowledge stored in relationship graphs 2050 can be used by operation mimicry system 100 to rearrange sequences of elements within view-structures of applications as they are presented to a user.

Physical Components

FIG. 23 is a block diagram illustrating components of an example machine able to read instructions from a machine-readable medium and execute them in one or more processors (or controllers). Specifically, FIG. 23 shows a diagrammatic representation of an example form of a computer system 2300. The computer system 2300 can be used to execute instructions 2324 (e.g., program code or software) for causing the machine to perform any one or more of the methodologies (or processes) described herein. The program code or software may be embodied as one or more instructions that may be stored in a non-transitory computer readable storage medium (e.g., storage unit 2316) and executable by one or more processors (e.g., processor 2302) In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 2324 (sequential or otherwise) that specify actions to be taken by that machine. Further, while only a single machine is illustrated, the term "machine" shall also be taken to include any collection of machines that individually or jointly execute instructions 2324 to perform any one or more of the methodologies discussed herein. In addition, it is noted that not all the components noted in FIG. 23 may be necessary for a machine to be configured to execute the systems and/or processes described within the disclosure.

The example computer system 2300 includes one or more processing units (generally processor 2302). The processor 2302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 2300 also includes a main memory 2304. The computer system may include a storage unit 2316. The processor 2302, memory 2304, and the storage unit 2316 communicate via a bus 2308.

In addition, the computer system 2300 can include a static memory 2306, a graphics display 2310 (e.g., to drive a plasma display panel (PDP), a liquid crystal display (LCD), or a projector). The computer system 2300 may also include alphanumeric input device 2312 (e.g., a keyboard), a cursor control device 2314 (e.g., a mouse, a trackball, a joystick, a motion sensor, or other pointing instrument), a signal generation device 2318 (e.g., a speaker), and a network interface device 2320, which also are configured to communicate via the bus 2308.

The storage unit 2316 includes a machine-readable medium 2322 on which is stored instructions 2324 (e.g., software) embodying any one or more of the methodologies or functions described herein. The instructions 2324 may also reside, completely or at least partially, within the main memory 2304 or within the processor 2302 (e.g., within a processor's cache memory) during execution thereof by the computer system 2300, the main memory 2304 and the processor 2302 also constituting machine-readable media. The instructions 2324 may be transmitted or received over a network 120 via the network interface device 2320.

While machine-readable medium 2322 is shown in an example embodiment to be a single medium, the term "machine-readable medium" should be taken to include a single medium or multiple media (e.g., a centralized or distributed database, or associated caches and servers) able to store the instructions 2324. The term "machine-readable medium" shall also be taken to include any medium that is capable of storing instructions 2324 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The application as disclosed provides benefits and advantages that include automatically executing operations of one or more applications that are required to complete a task. Additional benefits and advantages include the ability to perform tasks that depend on each other using one or more applications and without rendering user interface information to a screen, thereby making the process of completing all the tasks more efficient.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. [1A, 1B, 1C and 2]. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for developing sequences of operations to automatically respond to user defined tasks and operations that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing automatic transitions between functional units of execution, the method comprising:
   obtaining a control stream including a set of functional units and a set of conditions that, when met, identify a next functional unit of the set of functional units to be executed;
   executing a first functional unit of the control stream;
   receiving output data subsequent to execution of the first functional unit;

identifying information from the output data that can be accepted as input by one or more functional units of the control stream;

encoding the information from the output data into a standard data format;

storing the encoded output data in a data store;

selecting a subsequent unit for execution, the selection determined based on a condition of the control stream being met by a previously executed functional unit, the previously executed functional unit having been executed after the execution of the first functional unit, wherein the subsequent functional unit accepts the output data of the first functional unit as input;

retrieving the encoded output data from the data store;

decoding the encoded output data from the standard data format into an input format for the subsequent functional unit; and executing the subsequent functional unit.

2. The computer-implemented method of claim 1, wherein a functional unit comprises at least one of: a sequence of operations, a call to an application programming interface (API), and a function call to operating system functions.

3. The computer-implemented method of claim 1, wherein the output data includes at least one of: view-structure data, an API return value, and a return value from a function call.

4. The computer-implemented method of claim 1, wherein identifying information from output data that can be accepted as input by other functional units comprises parsing the output data using natural language processing techniques.

5. The computer-implemented method of claim 1, wherein identifying information from output data that can be accepted as input by other functional units comprises identifying a type of an API return value in the output data.

6. The computer-implemented method of claim 1, further comprising:

determining that the subsequent functional unit accepts a particular type of input data;

wherein the determination is based on input parameters of the subsequent functional unit.

7. The computer-implemented method of claim 1, further comprising configuring the subsequent functional unit for execution using the decoded data.

8. A computer system comprising:

at least one processor for executing computer program instructions; and a non-transitory computer-readable storage medium comprising stored instructions executable by the processor that when executed causes the processor to:

obtain a control stream including a set of functional units and a set of conditions that, when met, identify a next functional unit of the set of functional units to be executed;

execute a first functional unit of the control stream;

receive output data subsequent to execution of the first functional unit;

identify information from the output data that can be accepted as input by one or more functional units of the control stream;

encode the information from the output data into a standard data format;

store the encoded output data in a data store;

select a subsequent unit for execution, the selection determined based on a condition of the control stream being met by a previously executed functional unit, the previously executed functional unit having been executed after the execution of the first functional unit, wherein the subsequent functional unit accepts the output data of the first functional unit as input;

retrieve the encoded output data from the data store;

decode the encoded output data from the standard data format into an input format for the subsequent functional unit; and execute the subsequent functional unit.

9. The computer system of claim 8, wherein a functional unit comprises at least one of: a sequence of operations, a call to an application programming interface (API), and a function call to operating system functions.

10. The computer system of claim 8, wherein the output data includes at least one of: view-structure data, an API return value, and a return value from a function call.

11. The computer system of claim 8, wherein the instructions to identify information from output data that can be accepted as input by other functional units further comprises instructions that when executed causes the processor to parse the output data using natural language processing techniques.

12. The computer system of claim 8, wherein instructions to identify information from output data that can be accepted as input by other functional units further comprises instructions that when executed causes the processor to identify a type of an API return value in the output data.

13. A non-transitory computer-readable storage medium comprises stored computer program instructions executable by at least one processor of a system, the instructions when executed causes the processor to:

obtain a control stream including a set of functional units and a set of conditions that, when met, identify a next functional unit of the set of functional units to be executed;

execute a first functional unit of the control stream;

receive output data subsequent to execution of the first functional unit;

identify information from the output data that can be accepted as input by one or more functional units of the control stream;

encode the information from the output data into a standard data format;

store the encoded output data in a data store;

select a subsequent unit for execution, the selection determined based on a condition of the control stream being met by a previously executed functional unit, the previously executed functional unit having been executed after the execution of the first functional unit, wherein the subsequent functional unit accepts the output data of the first functional unit as input;

retrieve the encoded output data from the data store;

decode the encoded output data from the standard data format into an input format for the subsequent functional unit; and execute the subsequent functional unit.

14. The non-transitory computer-readable storage medium of claim 13, wherein a functional unit comprises at least one of: a sequence of operations, a call to an application programming interface (API), and a function call to operating system functions.

15. The non-transitory computer-readable storage medium of claim 13, wherein the output data includes at least one of: view-structure data, an API return value, and a return value from a function call.

16. The non-transitory computer-readable storage medium of claim 13, wherein the instructions to identify information from output data that can be accepted as input by other functional units comprises instructions that when executed causes the processor to parse the output data using natural language processing techniques.

17. The non-transitory computer-readable storage medium of claim 13, wherein instructions to identify information from output data that can be accepted as input by other functional units comprises instructions that when executed causes the processor to identify a type of an API return value in the output data.

18. The non-transitory computer-readable storage medium of claim 13, further comprising instructions that when executed causes the processor to:
   determine that the subsequent functional unit needs a particular type of input data;
   wherein the determination is based on input parameters of the functional unit.

* * * * *